US011386417B2

(12) United States Patent
Sinha et al.

(10) Patent No.: US 11,386,417 B2
(45) Date of Patent: Jul. 12, 2022

(54) PAYMENT METHODS AND SYSTEMS BY SCANNING QR CODES ALREADY PRESENT IN A USER DEVICE

(71) Applicant: MASTERCARD INTERNATIONAL INCORPORATED, Purchase, NY (US)

(72) Inventors: Ajay Sinha, Maharashtra (IN); Bhargav Jagdishchandra Modi, Gujarat (IN); Ajit Karnik, Maharashtra (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 3 days.

(21) Appl. No.: 16/676,261

(22) Filed: Nov. 6, 2019

(65) Prior Publication Data
US 2020/0151702 A1 May 14, 2020

(30) Foreign Application Priority Data
Nov. 9, 2018 (SG) .......................... 10201810001Y

(51) Int. Cl.
*G06Q 20/32* (2012.01)
*G06K 7/14* (2006.01)
*G06Q 20/10* (2012.01)

(52) U.S. Cl.
CPC ....... *G06Q 20/3274* (2013.01); *G06K 7/1417* (2013.01); *G06K 7/1443* (2013.01); *G06Q 20/102* (2013.01); *G06Q 20/3224* (2013.01)

(58) Field of Classification Search
None
See application file for complete search history.

(56) References Cited

U.S. PATENT DOCUMENTS

| 9,167,428 | B2 | 10/2015 | Buntinx |
| 9,794,527 | B1 | 10/2017 | Balez et al. |
| 10,152,229 | B2 * | 12/2018 | Peled ................. G06F 3/04886 |
| 10,181,067 | B2 | 1/2019 | Barnum |
| 10,296,894 | B2 | 5/2019 | Tyler et al. |

(Continued)

OTHER PUBLICATIONS

Softwarert, How to scan QR code on iPhone without using camera?, Aug. 18, 2018 retrieved from https://www.softwarert.com/scan-qr-code-wechat-iphone-without-camera/ (Year: 2018).*

(Continued)

*Primary Examiner* — Gregory S Cunningham, II
(74) *Attorney, Agent, or Firm* — Armstrong Teasdale LLP

(57) ABSTRACT

Embodiments provide methods and systems for reading a Quick Response (QR) code displayed in a user device of a user for facilitating a payment transaction. The method includes facilitating display of the QR code on a display screen of the user device. The QR code includes at least a payment related information for a payment transaction. The method also includes initializing a QR capture mode in the user device for capturing the QR code using a capture overlay frame. The method includes reading the QR code within the capture overlay frame to extract the payment related information. The method further includes facilitating the payment transaction based at least on the payment related information extracted by reading the QR code.

16 Claims, 16 Drawing Sheets

(56) References Cited

U.S. PATENT DOCUMENTS

| | | |
|---|---|---|
| 10,360,425 B2 | 7/2019 | Burkhart et al. |
| 10,803,432 B1* | 10/2020 | Miles .................. G06K 7/10 |
| 2006/0002607 A1 | 1/2006 | Boncyk et al. |
| 2010/0125508 A1* | 5/2010 | Smith .................. G06Q 20/10 |
| | | 705/16 |
| 2012/0209749 A1 | 8/2012 | Hammad et al. |
| 2013/0218721 A1* | 8/2013 | Borhan ............. G06Q 30/0267 |
| | | 705/26.41 |
| 2014/0310117 A1 | 10/2014 | Moshal |
| 2014/0349692 A1 | 11/2014 | Zhou et al. |
| 2015/0146925 A1* | 5/2015 | Son ..................... G06V 20/00 |
| | | 382/103 |
| 2015/0227787 A1* | 8/2015 | Mehta .................. G06F 40/174 |
| | | 705/40 |
| 2015/0248664 A1* | 9/2015 | Makhdumi ......... G06Q 20/3276 |
| | | 235/380 |
| 2017/0262819 A1* | 9/2017 | Malhotra ........... G06Q 20/3276 |
| 2019/0244192 A1 | 8/2019 | Katzin et al. |

OTHER PUBLICATIONS

Indian First Examination Report, Application No. 201914038142, dated Jun. 4, 2021, 5 pps.

* cited by examiner

PAYMENT METHODS AND SYSTEMS BY SCANNING QR CODES ALREADY PRESENT IN A USER DEVICE

CROSS REFERENCE TO RELATED APPLICATIONS

This patent application claims priority to Singapore Patent Application No. 10201810001Y filed on Nov. 9, 2018, the disclosure of which is incorporated by reference herein in its entirety as part of the present application.

BACKGROUND

The present disclosure relates to Quick Response (QR) codes based payment transactions and, more particularly to, methods and systems for reading QR codes displayed on a display screen of a user device for processing payment transactions using the same user device.

Quick Response codes also known as QR codes are prevalently used in various applications. The QR codes are commonly seen in stores, product packages, advertisements, banners, newspapers, magazines, posters, websites, business cards, email signatures, and even payment bills. A QR code is generally a two-dimensional matrix bar code with black dotted squares set on white background that offers legibility and data storage capability. A large amount of information can be encoded in the QR code. With the rise of smart devices, such as smart phones, use of QR codes in payment transactions has grown rapidly over the past few years. In view of this compelling evidence of growth of QR codes in payment transactions, several systems and standard bodies of payment methods have defined specifications for QR based payment transactions to ensure interoperability of applications for QR based payments. Typically, a QR code is scanned by a camera module of an electronic device in any 360° orientation. The scanned QR code is read by a QR code reader in the electronic device.

When the QR code is scanned from an external source, such as a printed copy or a display screen of another device, for example, a merchant device associated with a merchant, a customer comfortably scans and reads the QR code using the built-in camera in the smartphone. However, there may be a situation when the QR code is accessed in the smartphone of the customer. It may be infeasible for the customer to scan the QR code displayed in the smartphone and use the QR code in another application in the same smartphone. For instance, the customer may receive an invoice from the merchant for availing a service as a document via an email. The document includes a QR code provided by the merchant for facilitating a payment transaction from the customer to the merchant. The customer may open the document using a reading application in the smartphone that may cause display of the QR code in the smartphone. In such a scenario, the customer is restricted to scan the QR code by the same smartphone. Alternatively, the customer may print the document and capture the QR code using the smartphone. In another scenario, the customer may use a different device to capture the QR code displayed in the smartphone. However, such alternatives may be tedious and inconvenient for the customer in real-time scenarios. For instance, the customer may purchase products from an online store via the smartphone. At the time of payment, the online store may present a QR code to the customer for enabling an easy mode of payment for the products. The customer may access a payment application for making the payment using the QR code. However, there may be no option to capture the QR code displayed in a payment section of the online store and use the QR code in the payment application for processing the payment.

In view of the above-mentioned problems, there appears a need to devise techniques for making the payment transaction using the QR code that is present in the user device without using external camera or having a need to print the QR code.

BRIEF DESCRIPTION

Various embodiments of the present disclosure provide systems and methods for payment methods and systems by scanning QR codes already present in the user device.

An embodiment of the present disclosure provides a method. The method includes facilitating display of a QR code on a display screen of a user device. The QR code includes at least a payment related information for a payment transaction. The method also includes initializing a QR capture mode in the user device for capturing the QR code using a capture overlay frame. The method includes reading the QR code within the capture overlay frame to extract the payment related information. The method further includes facilitating the payment transaction based at least on the payment related information extracted by reading the QR code.

Another embodiment of the present disclosure provides a server system. The server system includes a database configured to store an instance of a payment application and a processor in operative communication with the database. The processor is configured to provision the payment application to user devices upon request. The payment application includes instructions configured to initialize a machine readable code capture mode in a user device for capturing a machine readable code present in a display screen of the user device. The machine readable code includes at least a payment related information for a payment transaction. The payment application includes instructions to read the machine readable code within the capture overlay frame to extract the payment related information. Further, the payment application is configured to facilitate the payment transaction in the payment application based at least on the payment related information extracted by reading the machine readable code.

Another embodiment of the present disclosure provides a method for a payment transaction using a QR code. The method includes facilitating display of the QR code on a display screen of a user device. The QR code includes at least a payment related information for the payment transaction. The method includes initializing a QR capture mode in the electronic device for capturing the QR code using a capture overlay frame. The method also includes localizing the QR code by dragging the capture overlay frame over the QR code in the display screen of the user device. The method also includes adapting the capture overlay frame based on a size of the QR code for capturing the QR code. The method includes reading the QR code within the capture overlay frame to extract the payment related information. The method further includes facilitating the payment transaction based at least on the payment related information extracted by reading the QR code.

Other aspects and example embodiments are provided in the drawings and the detailed description that follows.

BRIEF DESCRIPTION OF THE DRAWINGS

For a more complete understanding of example embodiments of the present technology, reference is now made to the following descriptions taken in connection with the accompanying drawings in which.

Figure 1:
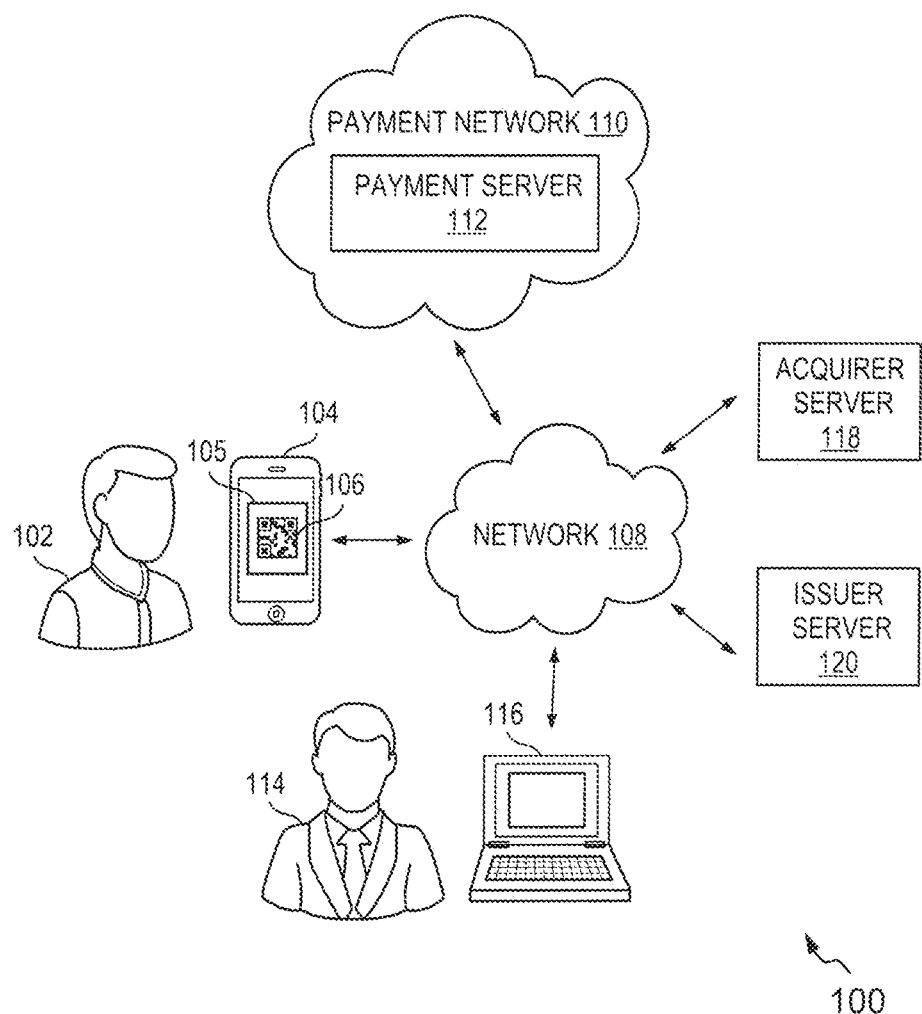
FIG. 1 illustrates an example representation of an environment in which at least some example embodiments of the present disclosure can be implemented.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "payment network", used throughout the description, refers to a network or collection of systems used for transfer of funds through use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by Mastercard®, VISA®, Discover®, American Express®, etc.

Overview

Various example embodiments of the present disclosure provide systems and methods for reading machine readable codes such as, QR code, bar code displayed in a user device that overcome obstacles discussed in background section in addition to providing additional advantages. More specifically, techniques disclosed herein overcome the need for taking a printed copy or the need for using additional devices for reading the machine readable code. Furthermore, the techniques disclosed support capturing of a machine readable code from one application (e.g., a reading/browsing application) and using in another application (e.g., a payment application). It shall be noted that hereinafter the description of the present disclosure is limited to payment using QR codes for exemplary purposes only, however, it will be apparent to those skilled in the art that the present disclosure can be practiced with any machine readable code.

In an embodiment, the user may enable a QR capture mode (also referred to as 'a machine readable code capture mode') in the user device for reading the QR code (also referred to as 'a machine readable code') in the user device. The QR code may be in a document, such as including but not limited to a text file, an image file, web page, pop-up, or a Uniform Resource Locator (URL). The document may be received from a merchant or a payee to whom the user has to pay. In some example embodiments, when the user checks out from an e-commerce website or online store, the merchant may present the QR code for initiating a payment transaction on a payment page of the e-commerce website/online store. The term 'merchant' as used hereinafter refers to a merchant facility equipped with electronic payment infrastructure that support QR code based payment for performing financial transactions in exchange for goods/services. An example of the merchant may be a restaurant, a book store, a coffee shop, a supermarket, or any service provider of a public/private organization.

The document may be accessed in the user device using the reading application to display the QR code on the display screen of the user device. The QR code on the display screen of the user device may be captured by enabling a QR capture mode in the user device. In an embodiment, a server system associated with a payment network provides a software application, referred to herein as a payment application, in response to download request received from the user device of the user. The payment application is configured to access the QR code in the user device. The QR code may be present in an email, a document, a website or a chat accessible in the user device. The QR code is read using a QR code reader and a set of QR data is extracted from the QR code. The set of QR data includes payment related information that may help in initiating the payment transaction. For example, the payment related information may include the merchant information such as, merchant identifier, merchant account details, service/product information, and optionally a payment amount.

In one example embodiment, the QR capture mode may be enabled from a collapsible action bar in the user device. The user may invoke the collapsible action bar to enable the QR capture mode in user device. After selecting the QR capture mode, a capture overlay frame appears on a display screen of the user device. The capture overlay frame helps in capturing the QR code displayed on the display screen. In another example embodiment, enabling the QR capture mode may provide a floating button that appears afloat on the display screen and can be moved anywhere on the display screen. The user may drag the floating button and position it over the QR code for capturing the QR code. For instance, finder patterns of the QR code are automatically identified by a QR code reader present in the user device. The finder patterns aid in detecting presence of QR code and orientation of the QR code. Subsequently, a data grid including actual data of the QR data is identified. However, it should be apparent to a person skilled in the art that the QR code can be read by any alternate technique including but not limited to reading coordinates of pixels, reading pixel data or the like to extract the set of QR data embedded in the QR code. Once the QR code is captured, the QR code reader extracts the set of QR data that may be used for processing the payment transaction for the merchant.

The reading of QR code displayed on a user device for making the payment transaction is further explained in detail with reference to FIGS. 1 to 12.

FIG. 1 illustrates an example representation of an environment 100, in which at least some example embodiments of the present disclosure can be implemented. The environment 100 includes a user 102 associated with a user device 104. In one example scenario, the user 102 may purchase items from a merchant 114. The merchant 114 may provide a machine readable code 106 for accepting payments from the user 102. Examples of the merchant 114 may include any retail shop, restaurant, supermarket or establishment, and/or private agencies, or any service provider that support QR code-based payment for performing financial transaction in exchange for any goods and/or services. The machine readable code 106 is generated by an acquirer server 118 associated with the merchant 114. The acquirer server 118 is associated with a financial institution normally called as a "merchant bank" or an "acquiring bank" or an "acquirer bank" or simply an "acquirer", in which the merchant 114 or the service provider entities may have an account.

Normally, the machine readable code 106 is displayed on a printed media, such as a board, a banner, or a poster. The machine readable code 106 may also be displayed on a display screen near a payment counter of the merchant 114. During payment, the user 102 may scan the machine readable code 106 and use the machine readable code 106 for processing a payment transaction for the merchant 114. In the illustrated embodiment, the user device 104 scans the machine readable code 106 using a camera module of the user device 104. In various embodiments, the user device 104 can be a smartphone, or a computing device, such as a computer system, or a laptop capable of capturing the machine readable code 106.

There may be various ways of providing the machine readable code 106 by the merchant 114 to the user 102. For instance, the merchant 114 may send a document with the machine readable code 106 to the user 102 via an email or a chat application through a network, such as a network 108. In some example embodiments, the machine readable code may be displayed on a display screen of the user device 104. The network 108 may include wired networks, wireless networks and combinations thereof. Some non-limiting examples of the wired networks may include Ethernet, local area networks (LANs), fiber-optic networks, and the like. Some non-limiting examples of the wireless networks may include cellular networks like GSM/3G/4G/5G/LTE/CDMA networks, wireless LANs, Bluetooth, Wi-Fi or Zigbee networks, and the like. An example of the combination of wired and wireless networks may include the Internet.

In one example, the merchant 114 may send the document with the machine readable code 106 to the user 102 via a merchant device 116. The merchant device 116 may include a smartphone, a computer system, a laptop, etc. In at least one example embodiment, the machine readable code 106 may be sent as an image file, text file, appear in a pop-up window or may be embedded in a URL link. Moreover, the machine readable code 106 provided by the merchant 114 may be displayed in a website for accepting payments from users, such as the user 102.

In an alternate example embodiment, a payee (the merchant 114) may generate the machine readable code 106 for accepting payments from the user 102. For instance, the merchant 114 may generate a machine readable code, such as a QR code with the help of a QR code generator or a third-party application for generating QR codes. The merchant 114 may send the machine readable code 106 to the user 102 in a chat conversation, for example, WhatsApp®, for providing an easy payment option for the user 102. The user 102 may use the machine readable code 106 for making a payment transaction to the payee (e.g., the merchant 114).

In an example embodiment, the user device 104 is equipped with an instance of an application 105. In an example, the application 105 and its components may be hosted by a payment server 112. The user device 104 can communicate with the payment server 112 through the application 105 installed in the user device 104 via the network 108 and a payment network 110. The application 105 is a set of computer executable codes configured to facilitate the user device 104 to access the machine readable code 106 displayed on a display screen of the user device 104. Moreover, the application 105 may enable the user device 104 to capture and read the machine readable code 106 displayed on the display screen in the user device 104. The set of computer executable codes may be stored in a non-transitory computer-readable medium of the user device 104. In some embodiments, the application 105 is a payment application for facilitating payment transactions from a payor (e.g., the user 102) to the payee (e.g., the merchant 114). The application 105 may be a mobile application or a web application. The term 'application 105' is interchangeably referred to as 'payment application 105' throughout the disclosure.

When the user 102 receives the document containing the machine readable code 106, the user 102 may use a reading application for accessing the document in the user device 104. When the document is accessed, the machine readable code 106 is displayed on the display screen of the user device 104. In one example embodiment, the application 105 is configured to enable a machine readable code capture mode (also referred to as 'a QR capture mode') in the user device 104 for capturing the machine readable code 106 displayed on the display screen of the user device 104. The machine readable code capture mode enables capturing of the machine readable code 106 from the reading application and using the machine readable code 106 in the application 105 for facilitating a payment transaction. The ability to access the machine readable code 106 displayed on the display screen in the user device 104 precludes the need for printing the machine readable code 106 or having to use another image capturing device to capture the machine readable code 106 from the user device 104.

After accessing the machine readable code 106, the machine readable code capture mode is enabled. In one example embodiment, a collapsing action bar may be accessed by the user 102 for capturing the machine readable code 106 using the machine readable code capture mode in the user device 104. An example of manually enabling the machine readable code capture mode is shown and explained with reference to FIG. 6B. In another example embodiment, the payment application 105 may be configured to automatically enable the machine readable code capture mode upon detecting the machine readable code 106, which is shown in FIG. 9C. When the machine readable code capture mode is enabled, a capture overlay frame is displayed on the display screen. The capture overlay frame adapts to capture the machine readable code 106. In one example embodiment, the user 102 may localize the machine readable code 106 by dragging the capture overlay frame over the machine readable code 106. The user 102 may adapt the capture overlay frame according to a size of the machine readable code 106. In another example embodiment, the machine readable code 106 may be localized automatically by the capture overlay frame. The capture overlay frame may automatically position itself over the machine readable code 106 and adapt based on the size of the machine readable code 106. After capturing the machine readable code 106, the machine readable code 106 is read by a code reader present in the user device 104 and for extracting a payment related information. In at least one example embodiment, a payment transaction is initiated using the payment related information. The payment related information may include merchant information such as, merchant name, merchant identifier, merchant account number, merchant acquirer, service/product details availed by the user such as, user identifier, service code, due date, and optionally a payment amount.

The payment application 105 sends the payment transaction request from the user device 104 to the payment server 112 via the payment network 110. The payment server 112 processes the payment transaction and settles payment transaction between the acquirer server 118 of the merchant 114 and an issuer server 120 of the user 102. The issuer server 120 is associated with a financial institution normally called as an "issuer bank" or "issuing bank" or simply "issuer", in which the user 102 may have an account, which issues one or more payment cards, such as a credit card or a debit card.

Some non-exhaustive example embodiments of reading the machine readable code 106 (also referred to as 'QR code 106') displayed on the display screen of the user device 104 is described with reference to FIGS. 2A-2B to 12.

Figure 2A:
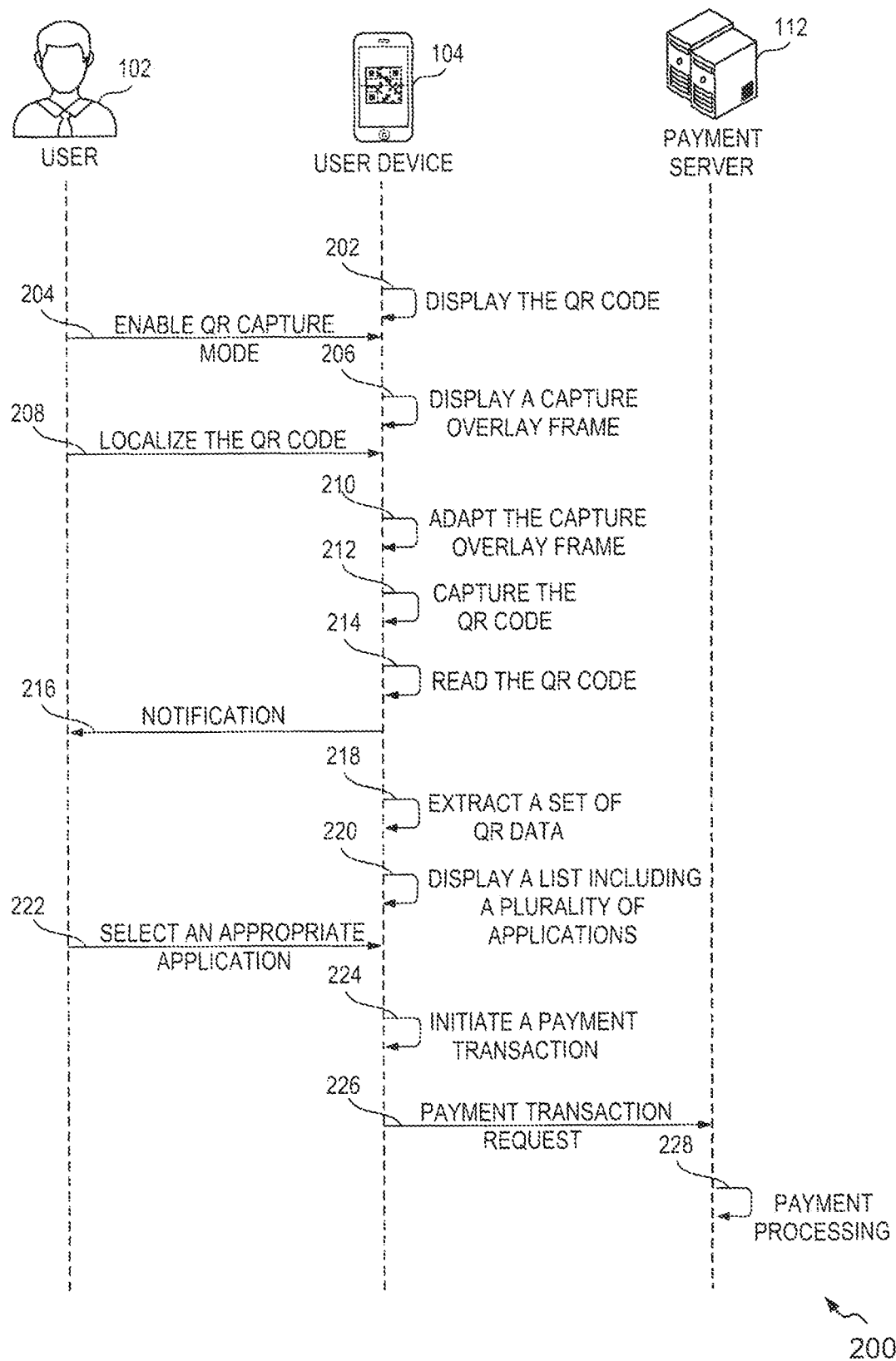
FIG. 2A represents a sequence flow diagram of reading a QR code displayed in a user device of a user for a payment transaction, in accordance with an example embodiment of the present disclosure.

FIG. 2A represents a sequence flow diagram 200 of reading a QR code (e.g., the QR code 106) displayed in the user device 104 of the user 102 for payment transaction, in accordance with an example embodiment of the present disclosure.

At 202, the QR code 106 is displayed in the user device 104. The QR code 106 may be present in a document or embedded in a URL link. The document may be opened in a reading application, and similarly, the URL link may be opened in a browsing application. When the document is opened in the reading application, the QR code 106 is displayed in the user device 104. Likewise, when the URL link is invoked, the QR code 106 is displayed in the user device 104. Without loss of generality, the payment application 105 may be initiated prior to accessing the QR code 106.

At 204, the user 102 enables a QR capture mode in the user device 104. In one example embodiment, the user 102 invokes the payment application 105 and accesses an option (referred to hereinafter as 'a paste QR option' as shown in FIG. 5C). When the user 102 provides a selection input on the paste QR option, the QR capture mode is automatically enabled and a floating button appears on a display screen (as shown in FIGS. 8C and 9C) of the user device 104. The floating button on detecting a QR code displays a capture overlay frame for reading the QR code 106 from the reading application and the paste QR option enables the user 102 to use the QR code 106 in the payment application 105. In one example embodiment, the QR capture mode may be manually enabled by the user 102. For instance, a collapsing action bar including the QR capture mode may appear in the user device 104. The user 102 may select the QR capture mode from the collapsing action bar for capturing the QR code 106. An example of using the QR capture mode of the collapsing action bar is shown and described with reference to FIG. 6B. In another embodiment, the QR capture mode is enabled automatically.

At 206, after activating the QR capture mode, a capture overlay frame appears on the display screen of the user device 104. At 208, the user 102 is facilitated to localize the QR code 106 displayed in the user device 104 by dragging the capture overlay frame on top of the QR code 106. In some example embodiments, the capture overlay frame automatically positions on the QR code 106. However, it must be noted that the capture overlay frame is provisioned for capturing the QR code 106 and may not necessarily be displayed as a frame over the QR code 106. At 210, the capture overlay frame adapts according to size of the QR code 106. In one example embodiment, the capture overlay frame may be adapted i.e. resized manually by the user 102. In another example embodiment, the capture overlay frame may adapt automatically based on size of the QR code 106 after localizing the QR code 106.

At 212, the QR code 106 is captured from the display screen of the user device 104 using the capture overlay frame in the user device 104. At 214, the QR code 106 is sent to a QR code reader and the QR code 106 is read by the QR code reader (see, FIG. 6D). In one example embodiment, the user device 104 may be configured to include the QR code reader. In another example embodiment, the payment application 105 may be configured to include a module of QR code reader. At 216, a notification is displayed to the user 102 indicating that the QR code 106 is successfully read. In one example embodiment, the notification may be a checkmark to indicate that the QR code is successfully read (see, 618 shown in FIG. 6C).

At 218, a set of QR data is extracted from the QR code 106. The set of QR data include payment related information, such as a merchant name, a merchant account number, a merchant identifier, a bank name, and/or a payment amount. In one example embodiment, a message along with the set of QR data is generated in the user device 104. The message may be made available to a plurality of applications for processing a payment transaction in the user device 104 via at least one application of the plurality of applications.

At 220, a list including the plurality of applications is displayed in the payment application 105 for further processing the payment transaction. The plurality of applications are applications present in the user device. At 222, the user 102 selects an appropriate application from the plurality of applications for initiating the payment transaction. In one instance, the appropriate application may be selected based on a preference already set by the user 102. In another instance, the appropriate application may be invoked automatically based on the set of QR data. For example, the set of QR data may include the merchant name, say, Merchant 1, and upon identifying an application (e.g., Merchant 1 app) matching with the merchant name, the payment application 105 may automatically open the Merchant 1 app.

At 224, after invoking the appropriate application, the payment transaction is initiated in the application. In one case, the QR code 106 may include static data and payment amount may not be specified in the QR code 106. In such case, the user 102 manually enters the payment amount in the payment application 105. In another case, if the QR code 106 includes dynamic data then the payment transaction is initiated automatically and there may not be a need to enter the payment amount.

At 226, a payment transaction request is sent to the payment server 112. At 228, the payment transaction is processed by the payment server 112 between an issuer account of the user 102 and an acquirer account of the merchant 114.

Figure 2B:
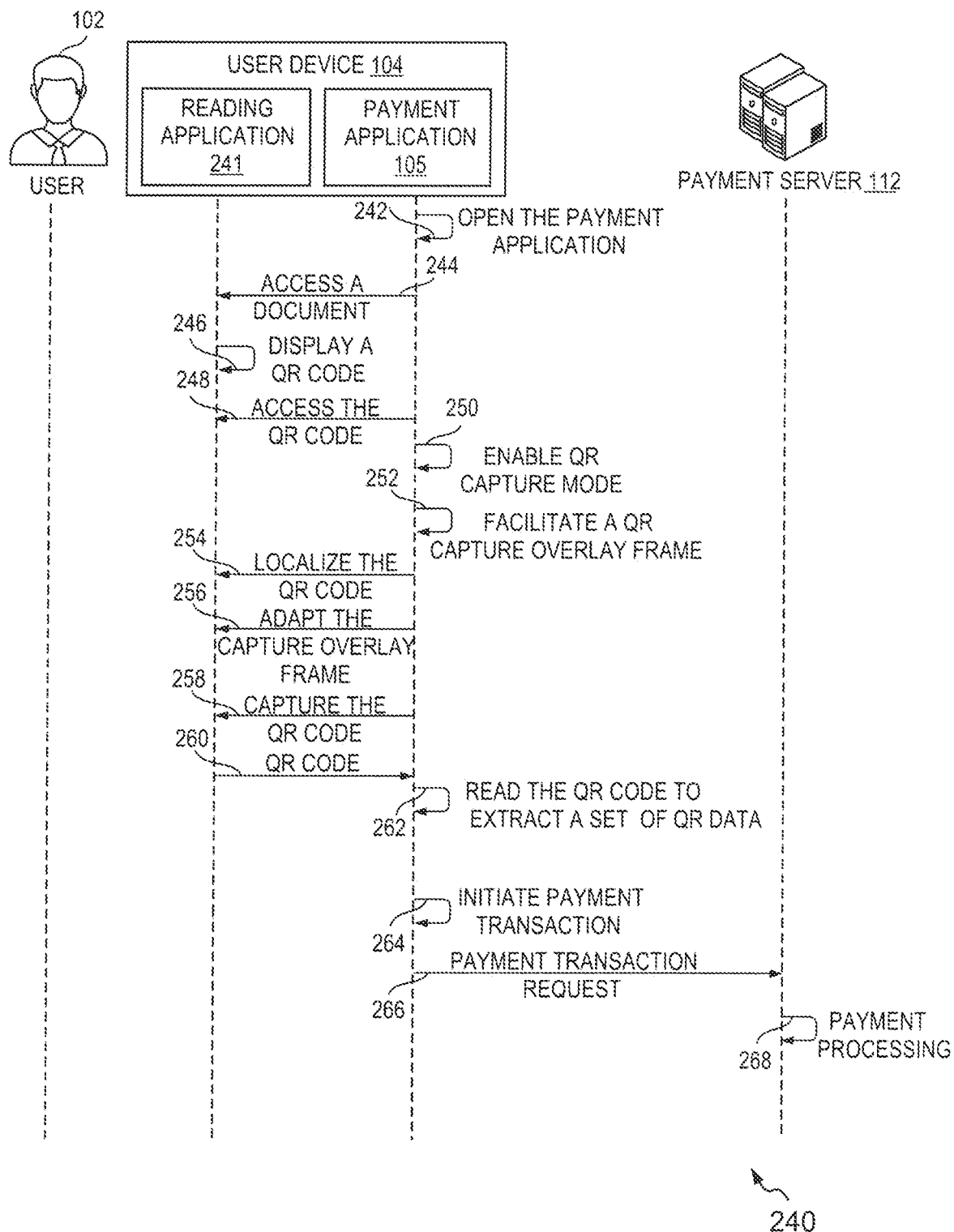
FIG. 2B represents a sequence flow diagram of reading a QR code displayed in the user device of the user for a payment transaction, in accordance with another example embodiment of the present disclosure.

FIG. 2B represents a sequence flow diagram 240 of reading the QR code 106 displayed on the user device 104 of the user 102 for a payment transaction, in accordance with another example embodiment of the present disclosure. The user device 104 has a reading application 241 for reading a document with the QR code 106. The QR code 106 is captured and read by initiating a payment application, such as the payment application 105 described with reference to FIG. 1.

At 242, the user 102 opens the payment application 105 in the user device 104. When the payment application 105 is initiated, the user 102 may select an option for processing payment by means of the QR code 106 for the merchant 114. The QR code 106 may be present in an email, a chat, a document, or embedded in a URL link. For instance, the QR code 106 may be present in a bill that is sent as a document to the user 102 by a merchant, such as the merchant 114 via email. The document may be viewed on the reading application 241. An example of the reading application 241 may be Adobe Reader®.

At 244, the payment application 105 accesses the document with the QR code 106. For instance, the payment application 105 may interact with the reading application 241 in the user device 104 through Application Programming Interface (API) calls for accessing the document with the QR code 106. The document is opened in the reading application 241 in the user device 104. At 246, the QR code 106 is displayed on a display screen of the user device 104. At 248, the payment application 105 accesses the QR code 106 displayed on the display screen of the user device 104.

At 250, the payment application 105 enables a QR capture mode. The QR capture mode may be provided in the payment application 105 or as an option in a collapsing action bar (see, 624 shown in FIG. 6B) of the user device 104. For example, the payment application 105 has a paste QR option for pasting at least a part of payment related information. When the user 102 invokes the paste QR option, the QR capture mode is enabled in the user device for capturing the QR code 106. At 252, after enabling the QR capture mode, the payment application 105 facilitates a QR capture overlay frame. At 254, the QR code 106 displayed in the user device 104 is localized. Herein, the term 'localizing' implies positioning the capture overlay frame such that the capture overlay frame lies on top of the QR code 106, and it may be user controlled and/or automatic/semi-automatic process. At 256, the capture overlay frame is adapted automatically based on size of the QR code 106. The capture overlay frame determines a size of the QR code 106 and automatically adapts dimensions of the capture overlay frame for reading payment related information of the merchant 114 in the QR code 106.

At 258, the QR code 106 that appears within the capture overlay frame is captured by the QR capture mode offered by payment application 105. At 260, the QR code 106 is sent to the payment application 105. At 262, the payment application 105 reads the QR code 106 for extracting a set of QR data from the QR code 106. The set of QR data includes payment related information and is read by a QR code reader of the payment application 105. At 264, a payment transaction is initiated by the payment application 105 based on the payment related information. The payment application 105 reads the set of QR data and accordingly initiates a payment transaction based on the merchant information in the set of QR data. At 266, a payment transaction request is sent to the payment server 112 from the payment application 105. At 268, the payment is processed by the payment server 112. For example, the payment server 112 authenticates the user 102 on the issuer server 120 and then settles the transaction between a merchant account of the merchant 114 and a user account of the user 102.

The QR code 106 may be displayed on the display screen of the user device 104 by invoking a browsing application to access the URL link containing the QR code. The QR code 106 may be captured and read manually by means of a QR capture mode, which is explained with reference to FIGS. 3A and 3B.

Figure 3A:
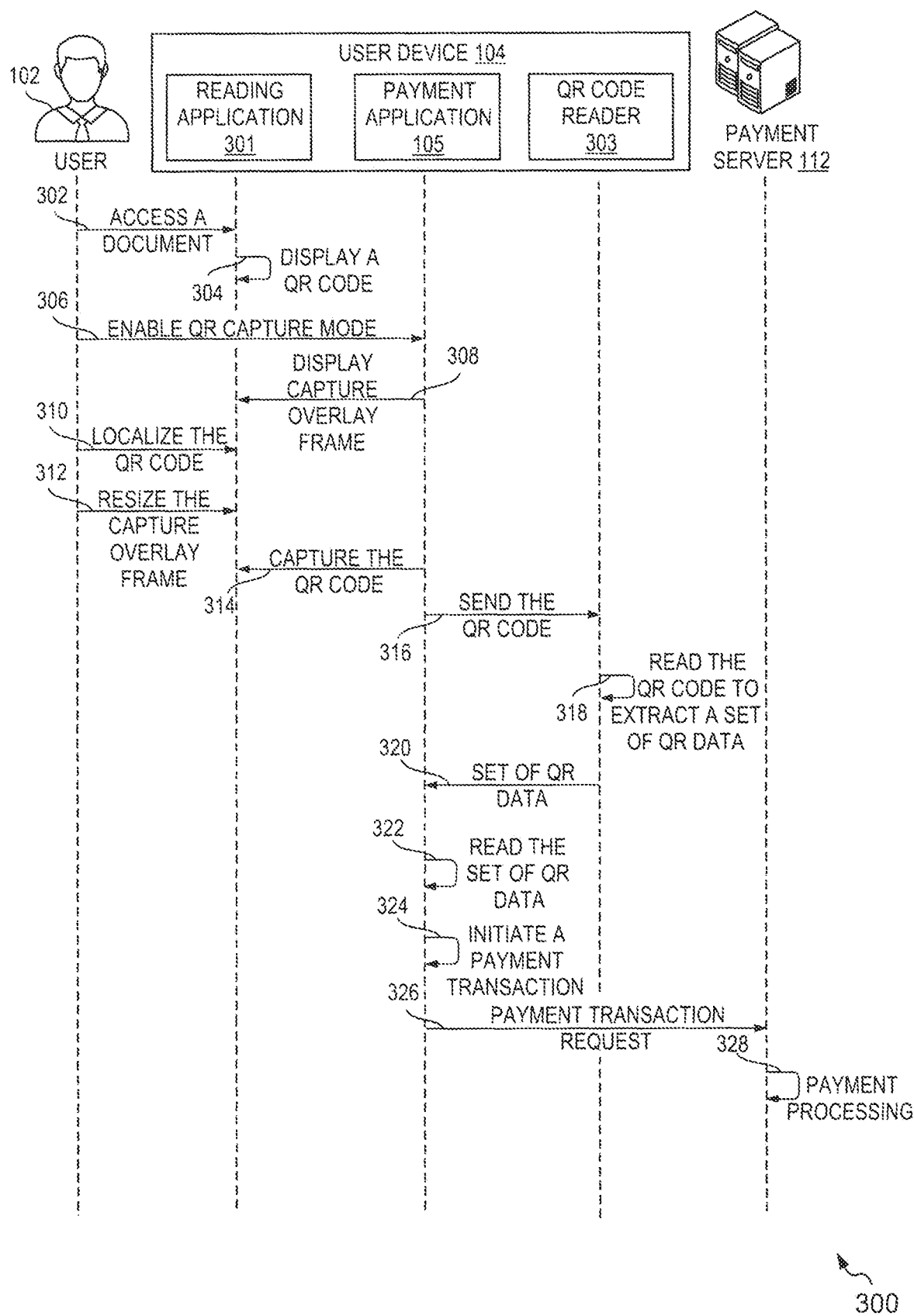
FIG. 3A represents a sequence flow diagram of reading a QR code displayed in the user device by manually enabling a QR code capture mode in the user device, in accordance with an example embodiment of the present disclosure.

Referring now to FIG. 3A, a sequence flow diagram 300 of reading the QR code 106 displayed in the user device 104 by manually enabling a QR capture mode in the user device 104 for payment transaction, is illustrated in accordance with an example embodiment of the present disclosure. The user 102 may receive a document with the QR code 106 for a payment transaction. For example, the document may be an invoice for services availed by the user 102 for a past month and the QR code 106 includes payment related information for a merchant to whom the user 102 has to pay for the services availed by the user 102. The document is accessed in a reading application 301 and the QR code 106 is displayed on a display screen of the user device 104. The QR code 106 is captured and used in the payment application 105 for processing the payment transaction.

At 302, the user 102 accesses the document in the reading application 301 for reading the document. The document may be sent as an attachment via an email, chat application, or as a multimedia message. The user 102 opens the document for viewing in the user device. At 304, the QR code 106 in the document is displayed on the display screen of the user device 104.

At 306, the user 102 enables a QR capture mode in the user device 104. In one example embodiment, the QR capture mode may be an option presented in a collapsible action bar of the user device 104 that can be accessed by the user 102. The QR capture mode enables the user 102 to capture the QR code 106 in the display screen of the user device 104.

At 308, a capture overlay frame is displayed on the display screen of the user device 104 for capturing the QR code 106. At 310, the user 102 localizes the QR code by dragging the capture overlay frame on the QR code 106. At 312, the capture overlay frame is manually resized based on a size of the QR code 106 by the user 102. Alternatively, the capture overlay frame can be automatically resized by the reading application 301. At 314, the QR code 106 within the capture overlay frame is captured by the payment application 105.

At 316, the QR code 106 is sent to a QR code reader 303. In one example, the user device 104 may be configured to include the QR code reader 303 in the user device 104. At 318, the QR code reader 303 reads the QR code 106 for extracting a set of QR data. The set of QR data may include payment related information such as merchant information of a merchant, for example, the merchant 114, user details related to service and optionally a payment amount for a payment transaction. At 320, the set of QR data is sent to the payment application 105. At 322, the payment application 105 reads the set of QR data.

At 324, a payment transaction is initiated at the payment application 105 based on the set of QR data for the merchant 114. At 326, a payment transaction request is sent to the payment server 112. At 328, the payment transaction is processed by the payment server 112.

Figure 3B:
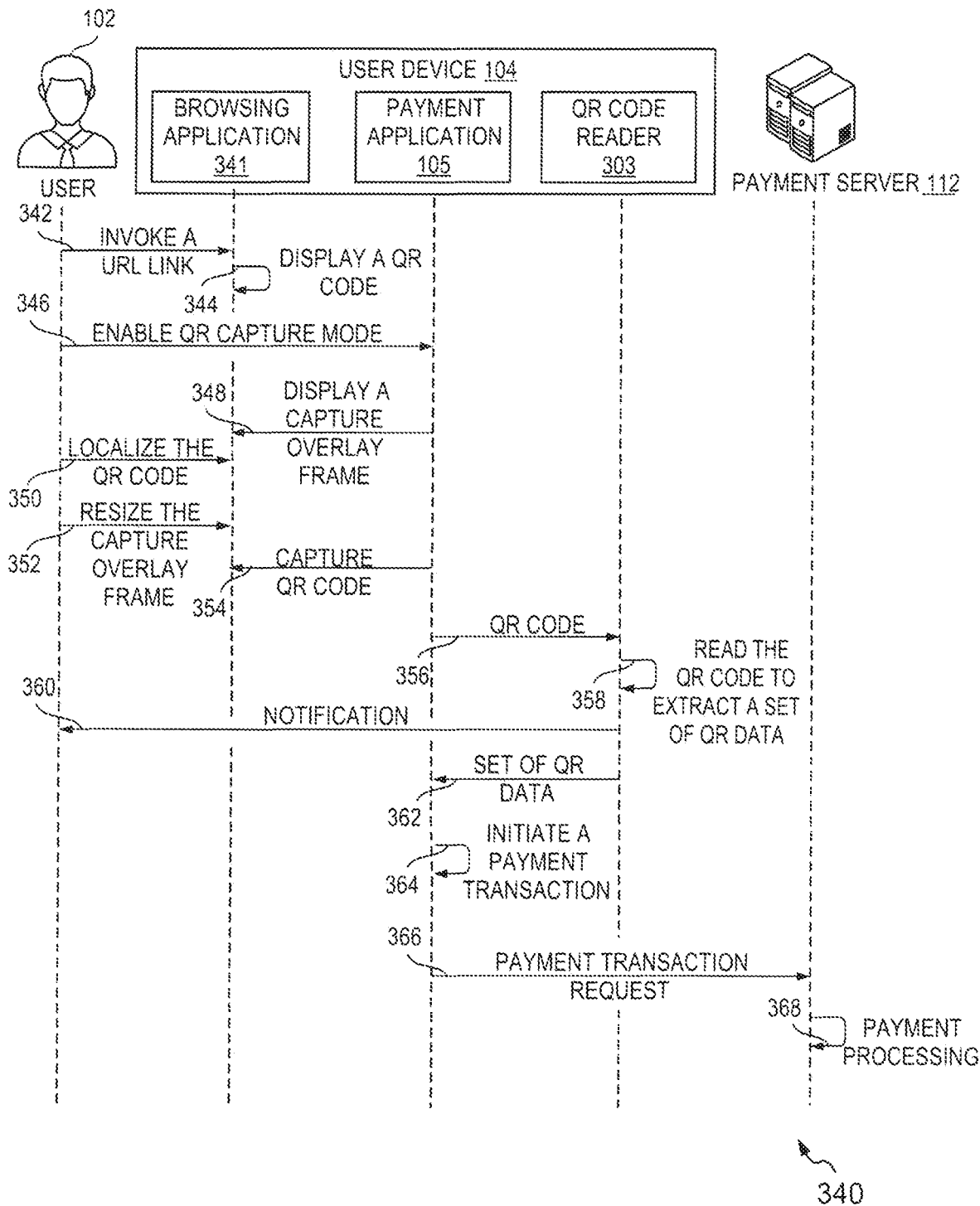
FIG. 3B represents a sequence flow diagram of reading a QR code displayed in the user device by manually enabling a QR code capture mode in the user device, in accordance with another example embodiment of the present disclosure.

Referring now to FIG. 3B, a sequence flow diagram 340 of reading the QR code 106 displayed on the display screen of the user device 104 by manually enabling the QR capture mode in the user device 104 for payment transaction, is illustrated in accordance with another example embodiment of the present disclosure. In an example embodiment, the user 102 may receive a URL link embedding the QR code 106. The URL link may be present in a document, a website or as a chat that is invoked in a browsing application 341. The QR code 106 may be sent by the merchant 114 to complete a payment transaction for products/services availed by the user 102. Here, the browsing application 341 may include a web-based browser or a mobile-based browser in the user device 104.

At 342, the user 102 invokes the URL link in the user device 104. The URL link opens on the browsing application 341. In at least one example embodiment, when the user 102 clicks on the URL link, a list of applications or browsers for opening the URL link is displayed in the user device 104. The user 102 may select an appropriate browser to open the URL link. At 344, a QR code, for example, the QR code 106 is displayed on the display screen of the user device 104. The QR code 106 may include payment related information such as, merchant information and optionally a payment amount for the good/services availed by the user 102.

At 346, the user 102 enables a QR capture mode in the user device 104. In an embodiment, the QR capture mode may be added as an option in a collapsible action bar of the user device 104. The user 102 provides a selection input on the option (QR capture mode) in the collapsible action bar for enabling the QR capture mode.

At 348, after enabling the QR capture mode, a capture overlay frame is displayed on the display screen of the user device 104. The capture overlay frame can be adapted to cover a region/area of interest that has to be captured. At 350, the user 102 drags the capture overlay frame on the QR code 106 and localizes the QR code 106. At 352, the capture overlay frame is resized manually by the user 102 (or automatically) based on a size of the QR code 106.

At 354, the payment application 105 captures the QR code 106 from the browsing application 341 using the capture overlay frame. At 356, the payment application 105 sends the QR code 106 to the QR code reader 303 in the user device 104.

At 358, the QR code reader 303 reads the QR code 106 to extract a set of QR data from the QR code 106. At 360, a notification may be optionally sent to the user 102 or displayed on the user device 104 indicating that the QR code 106 is successfully read. At 362, the QR code reader 303 sends the set of QR data to the payment application 105. The set of QR data includes payment related information such as, merchant information of the merchant 114, service details availed by the user 102 and optionally a payment amount to complete the payment transaction. At 364, the payment application 105 reads the set of QR data and accordingly initiates the payment transaction in the payment application 105. In some example embodiments, the payment application 105 may identify a merchant application based on the merchant information in the set of QR data and automatically invoke the merchant application to process the payment transaction. Alternatively, the payment application 105 may also display a prompt including a plurality of applications that may be used/accessed to process the payment transaction for the merchant 114. However, in this example representation, the description is limited to processing the payment transaction in the payment application 105. At 366, a payment transaction request is sent to the payment server 112. At 368, the payment transaction is processed by the payment server 112.

Alternatively, the QR capture mode in the user device 104 may be invoked automatically. For instance, the user 102 may select an option (referred to hereinafter as 'paste QR option' in the payment application 105) for processing a payment transaction to the merchant 114. When the paste QR option is selected, the QR capture mode is automatically enabled and a floating button is displayed in the user device 104 for capturing the QR code 106. The floating button appears as an overlay on top of any running application interface in the display screen of the user device 104. For instance, the floating button may appear on a document, an image or on anything displayed on the display screen of the user device 104. The floating button may be capable of automatically detecting the QR code 106 displayed in the user device 104 and capturing the QR code 106. The enabling of paste QR option in the payment application 105 for enabling the QR capture mode for automatically detecting and capturing of the QR code 106 using the floating button is explained with reference to FIGS. 4A and 4B.

Figure 4A:
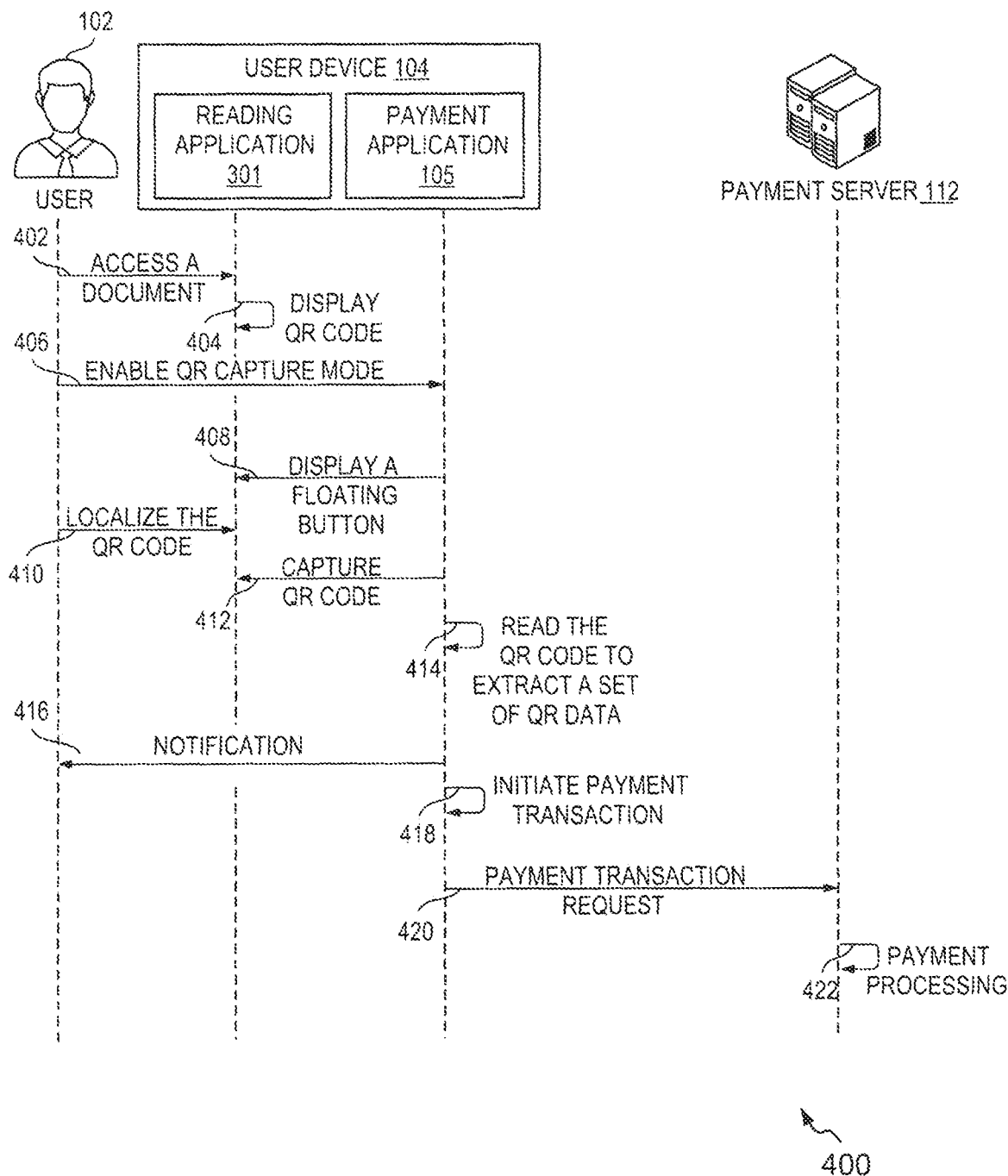
FIG. 4A represents a sequence flow diagram of reading a QR code displayed in the user device by automatically enabling the QR capture mode and capturing the QR code using a floating button, in accordance with an example embodiment of the present disclosure.

Referring now to FIG. 4A, a sequence flow diagram 400 of reading the QR code 106 displayed in the user device 104 by automatically enabling a QR capture mode and capturing the QR code 106 using a floating button for payment transaction is illustrated in accordance with an example embodiment of the present disclosure. In an example embodiment, the user 102 receives a document with the QR code 106 and access the document in a reading application, such as the reading application 301 described in FIG. 3A.

At 402, the user 102 accesses a document in the reading application 301 of the user device 102. At 404, the QR code 106 is displayed on the display screen of the user device 104.

At 406, the user 102 enables a QR capture mode in the payment application 105 by selecting/enabling a paste QR option in the payment application 105. At 408, a floating button is displayed in the display screen of the user device 104 upon selecting the paste QR option. The floating button is an overlay button that remains afloat on the display screen with any active application being accessed by the user 102. The user 102 can manually move the floating button and position it anywhere on the display screen so as to not obscure details of the active application. In at least one example embodiment, the floating button may be a transparent button that enables the user 102 to see through details of a document/application active in the display screen of the user device 104.

At 410, the user 102 localizes the QR code 106 displayed on the display screen of the user device 104 by dragging the floating button on top of the QR code 106. The payment application 105 may provide a capture overlay frame to localize the QR code 106. At 412, when the QR code 106 is localized (automatically or manually), the floating button captures the QR code 106. In one example embodiment, the floating button automatically detects the QR code 106 and generates a capture overlay frame. The capture overlay frame resizes automatically based on a size of the QR code 106. Examples of the floating button capturing the QR code 106 displayed on the payment application 105 is shown and explained with reference to FIGS. 9A to 9C.

At 414, the payment application 105 reads the QR code 106 captured from the reading application 301 for extracting a set of QR data. In one example embodiment, the payment application 105 may read the QR code 106 using a QR code reader of the payment application 105. At 416, a notification is optionally sent to the user 102 or displayed on the display screen of the user device 104 indicating that the QR code 106 is successfully read.

At 418, the payment application 105 initiates a payment transaction based on the set of QR data extracted from the QR code 106. At 420, the payment application 105 sends a payment transaction request to the payment server 112. At 422, the payment transaction is processed by the payment server 112.

Figure 4B:
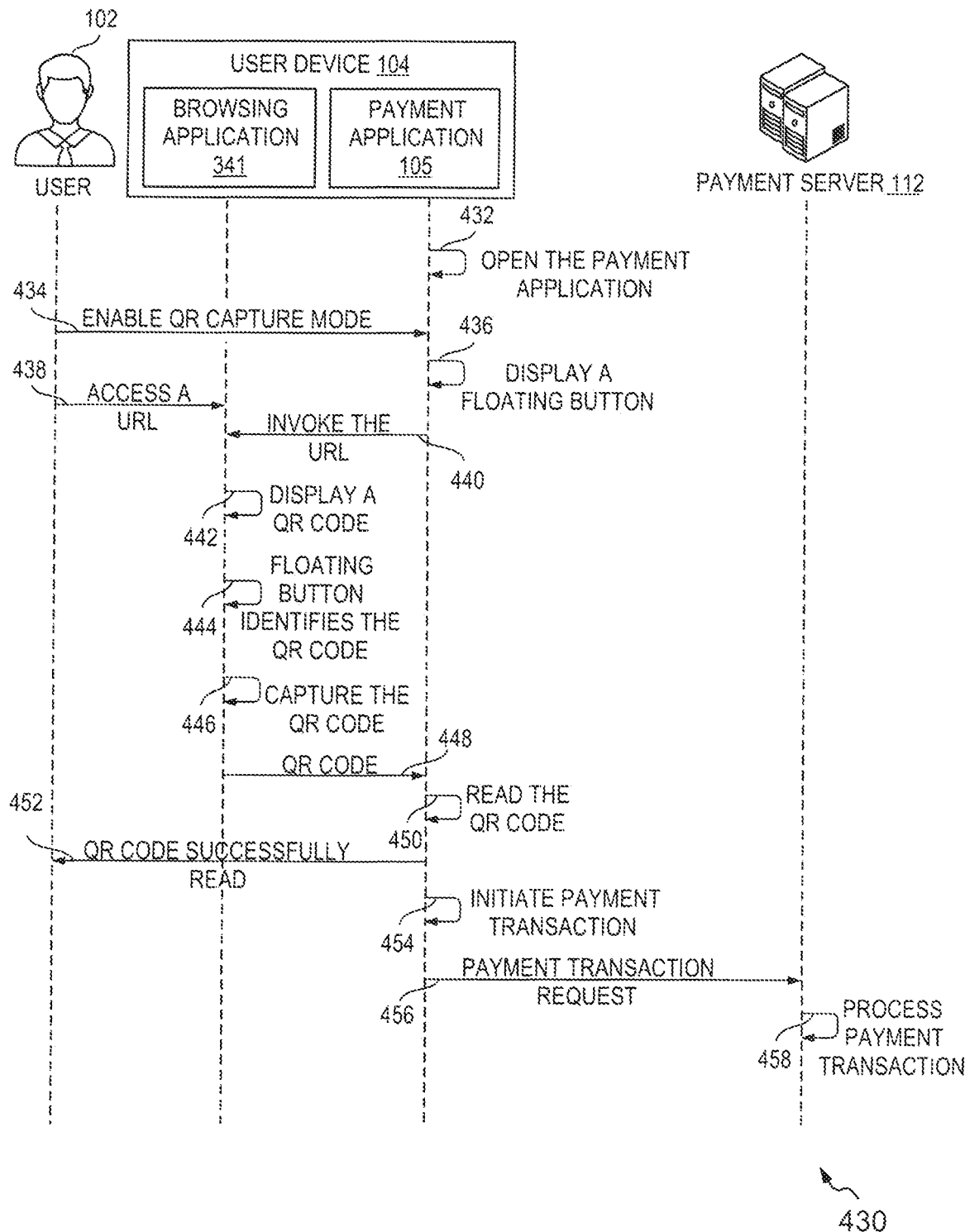
FIG. 4B represents a sequence flow diagram of reading the QR code displayed in the user device by automatically enabling the QR capture mode and capturing the QR code using a floating button, in accordance with another example embodiment of the present disclosure.

Referring now to FIG. 4B, a sequence flow diagram 430 of reading the QR code 106 displayed in the user device 104 by automatically enabling the QR capture mode and capturing the QR code 106 using a floating button is illustrated in accordance with another example embodiment of the present disclosure. The user 102 may receive a URL link embedding the QR code 106. In an example scenario, the user 102 may receive an invoice for a service availed over a past month from the merchant 114. The invoice may include a URL link indicating that payment information for the service is available in the URL link. A selection input on the URL link opens a page displaying the QR code 106. The URL link may be invoked in a browsing application, such the browsing application 341. The browsing application 341 may be a web-based browser or a mobile-based browser in the user device 104. The QR code 106 may include payment related information of the merchant 114 for making payment and optionally a payment amount for the service availed by the user 102.

At 432, the user 102 opens the payment application 105 associated with the payment server 112 on the user device 104. The payment application 105 may be a web application or a mobile application. In an embodiment, the payment application 105 may be downloaded from the payment server 112 and installed on the user device 104 therein. The payment application 105 may be used to facilitate payment transactions to merchants, for example, the merchant 114.

At 434, the user 102 enables the QR capture mode in the user device 104 by selecting the paste QR option in the payment application 105. For instance, when the user 102 intends to initiate a payment transaction for a merchant (e.g., the merchant 114), the user 102 may need the payment related information that includes merchant information such as, merchant account number, merchant acquirer, merchant identifier and merchant name, service details availed by the user 102 and optionally a payment amount for processing the transaction. The merchant 114 may share a URL or a document including the URL. The URL includes the QR code 106 that includes the payment related information of the merchant 114 for facilitating the payment. This QR code 106 needs to be captured and pasted in the payment application 105 for processing the payment transaction. At 436, a floating button is displayed on the display screen of the user device 104 upon selecting the paste QR option. The floating button stays afloat on the display screen as an overlay over any active application in the user device 104.

At 438, the user 102 accesses a document including a URL link in the user device 104. The URL link may embed a QR code (e.g., the QR code 106) that may be accessed by invoking the browsing application 341 to access the URL link. As illustrated, the document may be accessed over any browsing application such as the browsing application 341 (e.g., Google Chrome®, Mozilla Firefox®) for reading contents of the document. Alternatively, the document may be accessed over a reading application, such as, the reading application 301 (e.g., Adobe Reader®). In an example, the merchant 114 may have shared an invoice (document) for a service via an email application. The user 102 opens the email via the browsing application 341 and accesses the invoice for reading contents via the reading application 301. In some example embodiment, the URL link may be present in any other application (e.g., service provider application/merchant application) installed in the user device 104. At 440, the floating button detects the URL link embedding the QR code 106 and automatically invokes the URL link. In an example, when the URL link appears on the display screen, the floating button that is already afloat on the display screen identifies the URL link and invokes the URL link in the browsing application 341 or any appropriate browser to open the URL link.

At 442, the QR code 106 is displayed on the display screen of the user device 104 upon opening the URL link. At 444, the floating button automatically identifies the QR code 106. The floating button automatically localizes the QR code 106 displayed in the user device 104. At 446, the floating button captures the QR code 106 using a capture overlay frame that automatically resizes based on a size of the QR code 106. In at least some example embodiments, the user 104 can manually resize the capture overlay frame for capturing the QR code 106 in the browsing application 341.

At 448, the captured QR code 106 is sent to the payment application 105. At 450, the QR code 106 is read by the payment application 105 using a QR code reader for extracting a set of QR data. The set of QR data may include the payment related information for processing the payment transaction via the payment application 105. At 452, a notification is optionally displayed to the user 102 indicating that the QR code 106 is successfully read on the payment application 105.

At 454, a payment transaction is initiated in the payment application 105 for the merchant 114 based on the set of QR data. At 456, a payment transaction request is sent to the payment server 112. At 458, the payment transaction is processed by the payment server 112.

Various embodiments cause provision of one or more user interfaces (UIs) for facilitating capture of a QR code for processing a payment transaction to the merchant 114. Some example UIs of the reading application 301, the browsing application 341 or the payment application 105 facilitating capture of the QR code are shown and explained with reference to FIGS. 5A-5C to 9A-9C.

Figure 5A:
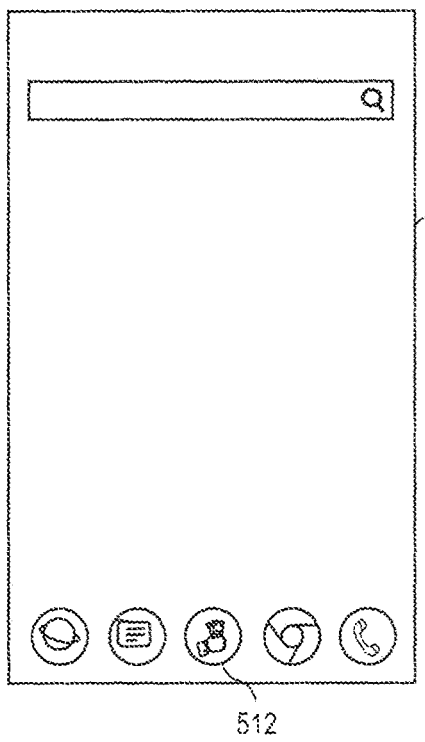
FIG. 5A shows an example representation of a user interface (UI) displayed to a user on a display screen of a user device displaying an application icon of a payment application, in accordance with an example embodiment of the present disclosure.

Referring now to FIG. 5A, an example representation of a UI 510 displayed to the user 102 on the display screen of the user device 104 displaying an application icon 512 of a payment application (e.g., the payment application 105) is shown in accordance with an example embodiment of the present disclosure. In an example scenario, after downloading of the payment application 105 from the payment server 112 (shown in FIG. 1), an application icon 512 may be displayed to the user 102 on the display screen of the user device 104 as shown in FIG. 5A.

In the UI 510, an exemplary display of the application icon 512 with other application icons in home screen of the user device 104 is shown. It is noted that the provisioning of the application icon 512 is explained herein for illustration purposes and may not be considered as limiting the scope of the disclosure. The user 102 may provide a selection input on the application icon 512 to invoke the payment application 105. The payment application 105, after invoking, may present one or more UIs for authenticating the user 102. An example UI provisioned to the user 102 for authenticating identity of the user 102 is shown in FIG. 5B.

Figure 5B:
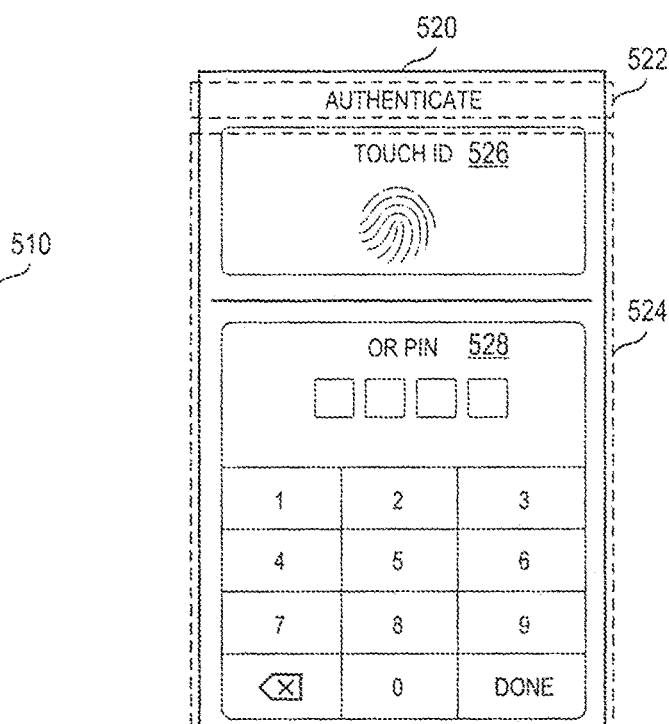
FIG. 5B shows an example representation of a UI displayed to the user on the display screen of the user device for authenticating identity of the user, in accordance with an example embodiment of the present disclosure.
Figure 5C:
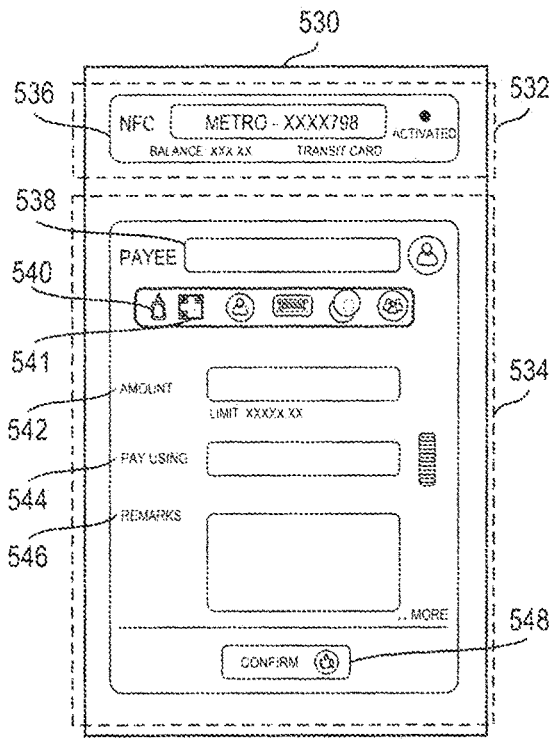
FIG. 5C shows an example representation of a UI displayed to the user on the display screen of the user device for facilitating a payment transaction, in accordance with an example embodiment of the present disclosure.

Referring now to FIG. 5B, an example representation of a UI 520 displayed to the user 102 on the display screen of the user device 104 displaying a page to authenticate the user 102 is shown in accordance with an example embodiment of the present disclosure. The UI 520 is presented to the user 102 in response to the selection of the application icon 512 in the UI 510 (shown in FIG. 5A).

The UI 520 is depicted to include a header portion 522 and a content portion 524. The header portion 522 is depicted to exemplarily display a title associated with text 'AUTHENTICATE'.

The content portion 524 displays options for authenticating the user 102. The user 102 may be authenticated by receiving a biometric data via a fingerprint option 526 associated with text "TOUCH ID". Alternatively, the user 102 may be authenticated based on a Personal Identification Number (PIN) from the user 102 via a PIN option 528 associated with text "PIN". The user 102 may enter the PIN by selecting numbers from a virtual number pad or a physical keypad. It shall be noted that biometric authentication using fingerprint and authentication using a static password such as PIN are shown for exemplary purposes only in FIG. 5B and should not be considered to limit the scope of the disclosure. Moreover, authentication techniques such as face recognition, voice recognition and the like may be used to authenticate an identity of the user 102 accessing the payment application 105.

The authentication of the user 102 via the UI 520 may cause display of another UI displaying a page for initiating the payment transaction. An example UI provisioned to the user 102 for the payment transaction after authenticating the user 102 is shown and explained with reference to FIG. 5C.

Referring now to FIG. 5C, an example representation of a UI 530 displayed to the user 102 on the display screen of the user device 104 displaying a page for a payment transaction is shown in accordance with an example embodiment of the present disclosure.

The UI 530 is depicted to include a header portion 532 and a content portion 534. The header portion 532 is depicted to exemplarily display details of a default card 536 selected by the user 102 in the payment application 105. In this example representation, the default card 536 is a Near Field Communication (NFC) enabled card or contactless card. The NFC card is a transit card titled "METRO" and the last 3 digits of the transit card "798" appear beside the title of the transit card. The header portion 532 also displays a status of the NFC card as "ACTIVATED" indicating that the NFC card may be used for availing and paying for a service without further accessing the payment application 105.

The content portion 534 is depicted to include a payee field 538 associated with text "PAYEE" for entering name of a merchant. The user 102 may enter a merchant name manually in the payee field 538. There may be alternatives for entering a merchant that are supported by different tabs, such as a paste QR tab 540, a scan QR tab 541, a contact list tab, a virtual keyboard, a smart pay tab, and an organization tab. As seen in FIG. 5C, the paste QR tab 540 enables a QR capture mode either automatically or manually for capturing a QR code displayed in the user device 104. In one example embodiment, the QR code can be captured automatically using a float button that automatically appears on the display screen of the user device 104 when the user 102 selects the paste QR tab 540 and subsequently accesses a document including the QR code. An example of capturing the QR code using the floating button is shown and explained with reference to FIGS. 8A-8C to 9A-9C. Alternatively, the QR capture mode may be enabled manually from a collapsible action bar (shown in FIG. 6B) for capturing the QR code and then the merchant information in the QR code can be manually pasted/copied in the payee input box 538. An example of capturing the QR code manually using the QR capture mode is shown and explained with reference to FIGS. 6A-6C.

The scan QR tab 541 supports scanning and reading of a QR code by capturing the QR code using a camera module of the user device 104. The contact list tab allows the user 102 to select the merchant from a contact list in the user device 104. The virtual keyboard tab provides a virtual keypad allowing the user 102 to enter merchant name. When the user 102 selects the smart pay tab, a list of applications is displayed. The user 102 can selects an application from the list of applications for processing the payment using the QR code captured by the payment application 105. In one example embodiment, the payment transaction may be initiated using a QR code, such as the QR code 106 described with reference to FIG. 1. In one scenario, if the QR code 106 is a static QR code, then the user 102 may enter a payment amount manually. In such a scenario, the user 102 may enter the payment amount in a text box 542 associated with text "AMOUNT". In another scenario, if the QR code 106 is a dynamic QR code then the payment amount is automatically entered/filled up in the text box 542.

Furthermore, the user 102 may pay the payment amount using a payment card, such as a credit card, a debit card, or a digital wallet. As seen in FIG. 5C, an option 544 associated with text "PAY USING" allows the user 102 to select the payment option from a list of options. When the user 102 invokes the option 544, a drop-down list menu of payment cards and digital wallets may be displayed. The user 102 may enter a remark for the payment in a text box 546 associated with text "REMARK". The user 102 may invoke a payment transaction by clicking on a confirm tab 548.

In an example, the user 102 may receive a bill/invoice as a document via an email. The document may be from a merchant or any service provider that support a QR based payment method. The document may include a QR code including merchant/service provider information for facilitating a payment transaction. The user 102 may access the document using a reading application in the user device 104. At the same time, the user 102 may prefer to use the same user device 104 for making the payment transaction using the QR code in the document. The user 102 may select the paste QR tab 540 in the payment application 105 and capture the QR code in the document. In one example scenario, the QR code in the document is captured by enabling a QR capture mode manually in the user device, which is described with reference to FIGS. 6A to 6C.

Figure 6A:
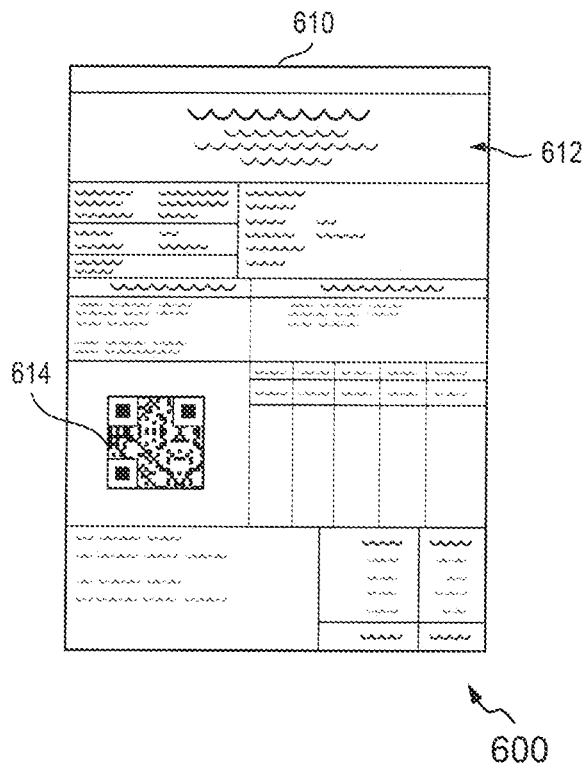
FIG. 6A illustrates an example representation of a UI displayed to the user on the display screen of the user device depicting a document with a QR code in a reading application, in accordance with an example embodiment of the present disclosure.

FIG. 6A illustrates an example representation of a UI 610 of a reading application 600, in accordance with example embodiment. Specifically, the UI 610 of the reading application 600 displays a document 612 with a QR code 614. The reading application 600 is an example of the reading application 301 and may include a document reader application such as, Adobe Reader® or the like. The document 612 may include information related to a product purchased by the user 102 with payment related information. The QR code 614 is now displayed on the display screen of the user device 104. The user 102 may enable a QR capture mode to capture the QR code 614, which is described in FIG. 6B.

Figure 6B:
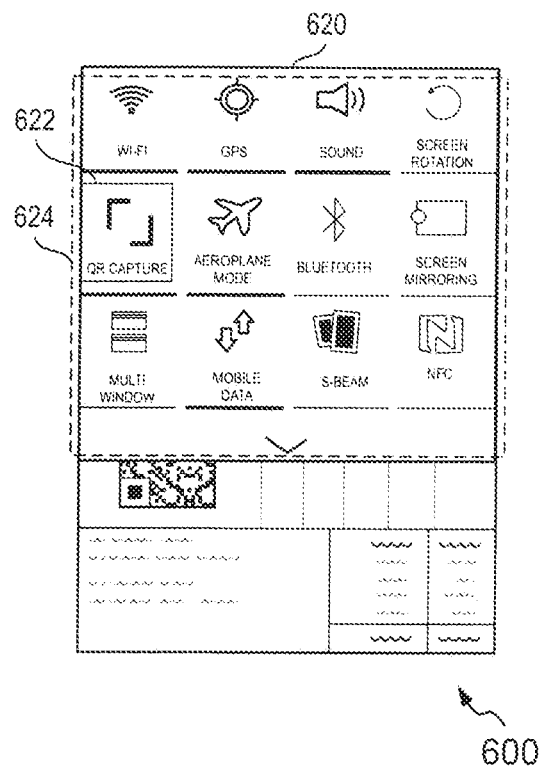
FIG. 6B illustrates an example representation of a UI displayed to the user on the display screen of the user device depicting enablement of a QR capture mode for capturing a QR code, in accordance with an example embodiment of the present disclosure.

In FIG. 6B, an example representation of a UI 620 is displayed to the user 102 on the display screen of the user device 104. The UI 620 depicts a collapsible action bar 624 for enablement of a QR capture mode 622. The QR capture mode 622 may be an option provided by an application, such as the payment application 105 described with reference to FIGS. 5A to 5C. The QR capture mode 622 is provided as an option in the collapsible action bar 624 in the user device 104. In an alternate example embodiment, the user device 104 may be factory installed with the QR capture mode 622 for capturing QR codes in the display screen. For instance, a program for enabling the QR capture mode 622 may be embedded in an operating system of the user device 104 at the time of manufacturing or can be installed later.

In an illustrated embodiment, the QR capture mode 622 is selected from the collapsible action bar 624 in the user device 104 and the QR capture mode 622 is enabled. When the QR capture mode 622 is enabled, the QR code 614 displayed on the display screen may be captured as described with reference to FIG. 6C.

Figure 6C:
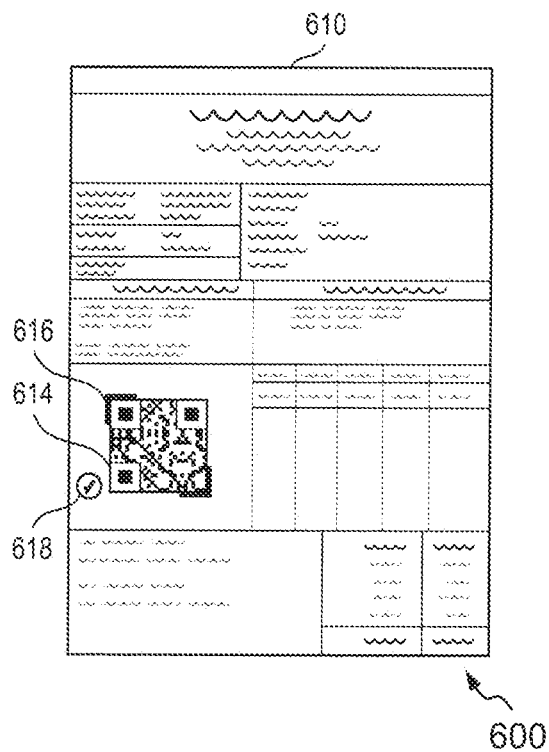
FIG. 6C illustrates an example representation of the UI displayed to the user on the display screen of the user device depicting reading of the QR code in the document, in accordance with an example embodiment of the present disclosure.

Referring now to FIG. 6C, an example representation of the UI 610 depicting reading of the QR code 614 present in the document 612 is illustrated in accordance with an example embodiment of the present disclosure. In the illustrated embodiment, from the document 612, the QR code 614 is captured using a capture overlay frame 616. When the QR capture mode 622 is enabled, the capture overlay frame 616 is displayed on the display screen of the user device 104 for capturing the QR code 614.

In one example embodiment, the user 102 localizes the QR code 614 by dragging the capture overlay frame 616 on top of the QR code 614. The capture overlay frame 616 may appear with a pre-defined size that may or may not fit the QR code 614. If the capture overlay frame 616 does not completely overlap the QR code 614, then the user 102 may resize the capture overlay frame 616 according to size of the QR code 614. In another example embodiment, the capture overlay frame 616 may identify dimensions of the QR code 614 and its size is automatically adapted based on the size of the QR code 614.

When the capture overlay frame 616 is resized to match the size of the QR code 614, the QR code 614 is captured. After capturing the QR code 614, the QR code 614 is read and a checkmark 618 is displayed to indicate that the QR code 614 is successfully read. In one example embodiment, the captured QR code 614 is sent to the payment application 105. The payment application 105 reads the QR code 614 using a QR code reader, which may be performed in a backend process. In another example embodiment, the user device 104 may be equipped with a QR code reader that is configured to read the QR code 614.

Figure 7A:
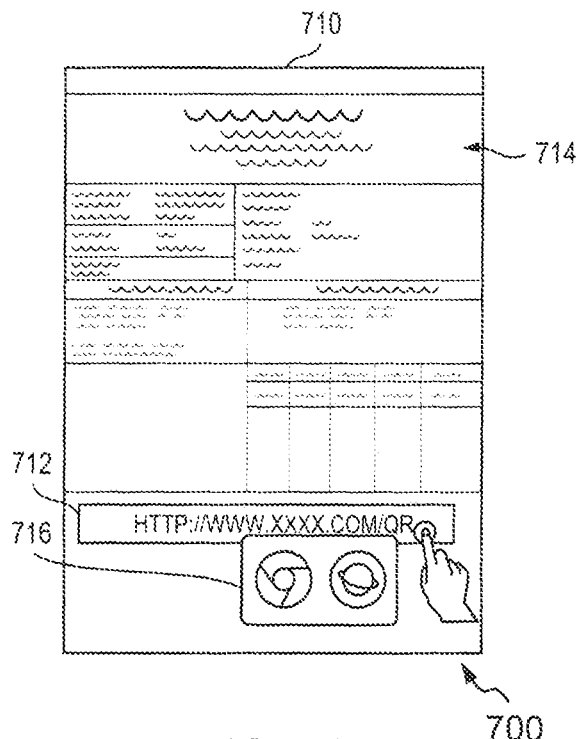
FIG. 7A illustrates an example representation of a UI displayed to a user on a display screen of a user device depicting automatic identification of a Uniform Resource Locator (URL) link embedded with a QR code for a payment transaction, in accordance with an example embodiment of the present disclosure.
Figure 7B:
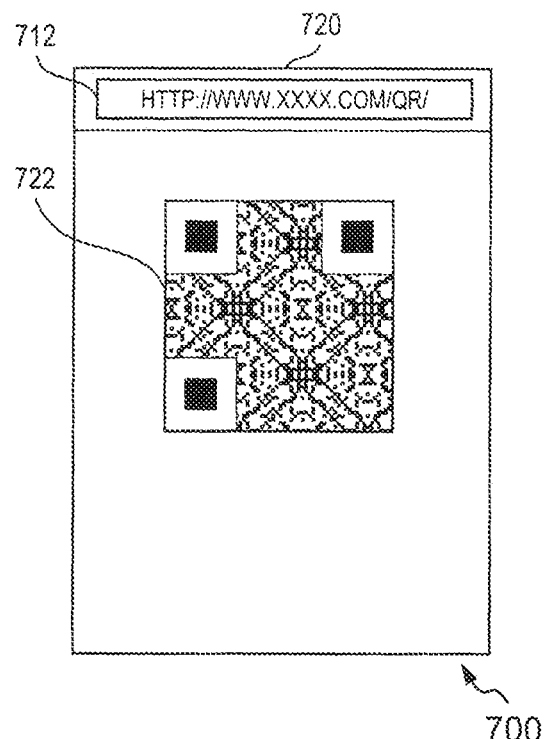
FIG. 7B illustrates an example representation of a UI displayed to the user on the display screen of the user device depicting a QR code displayed upon providing a selection input on the URL link, in accordance with an example embodiment of the present disclosure.
Figure 7C:
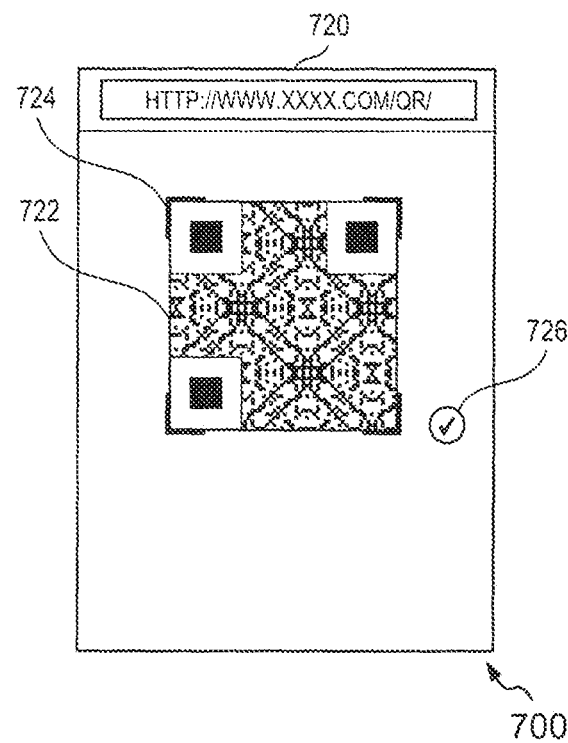
FIG. 7C illustrates an example representation of a UI displayed to the user on the display screen of the user device depicting reading of the QR code from the URL link, in accordance with an example embodiment of the present disclosure.

In another example embodiment, the user 102 may receive the document 612 with a URL link. The URL link may embed a QR code, such as the QR code 614. The user 102 may receive the URL link directly in an email, a chat, or a message. The user 102 clicks on the URL link to access the QR code and captures the QR code by enabling the QR capture mode 622, which is shown in FIGS. 7A to 7C.

Figure 6D:
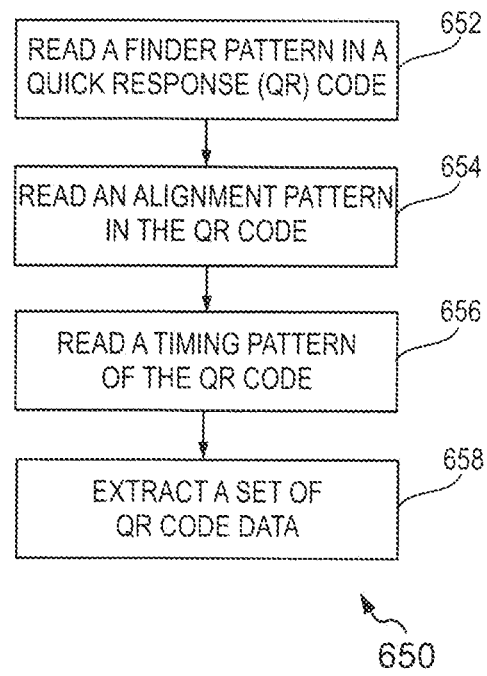
FIG. 6D illustrates a flow diagram depicting a method for extracting a set of QR data from a QR code by a QR code reader, in accordance with an example embodiment of the present disclosure.

FIG. 6D illustrates a flow diagram depicting a method 650 for extracting a set of QR data from a QR code by a QR code reader, in accordance with an example embodiment of the present disclosure. The method 650 depicted in the flow diagram may be executed by, for example, a user device equipped with a QR code reader/reading module. The QR code is displayed on a display screen of the user device. The QR code includes finder patterns, alignment patterns, timing patterns, and a data grid. The data grid includes payment related information for initiating the payment transaction. It should be noted that the flowchart depicting the method 650 has been shown for exemplary purposes only. However, it should be apparent to a person skilled in the art that alternate techniques may be employed by a QR code reader to read the QR code.

At operation 652, the method 650 includes reading the finder pattern in a QR code. In a non-limiting example, the finder patterns appear as black squares and/or white squares on corners of the QR code. The finder patterns help the QR code reader to identify the QR code in a display screen of a user device. Moreover, orientation of the QR code in the display screen can also be determined based on the finder patterns.

At operation 654, the method 650 includes reading the alignment pattern in the QR code. The alignment patterns are smaller than the finder patterns and appear as black and white blocks/squares in the QR code. The QR code reader uses the alignment patterns of the QR code to modify orientation of the QR code and help straighten the QR code prior to reading the data grid.

At operation 656, the method 650 includes reading the timing pattern of the QR code. The timing pattern of the QR code enables the QR code reader to identify the data grid in the QR code. The timing pattern of the QR code appears as alternating black and white blocks/squares on the QR code.

At operation 658, the method 650 includes extracting a set of QR code data from the QR code. For instance, the QR code reader identifies the data grid to read the QR matrix. The data grid includes a plurality of data blocks that embed the payment related information. The plurality of data blocks is decoded to determine a unicode data (also referred to as 'the set of QR code data'). In a non-limiting example, the unicode data is determined by the QR code reader from 16 modules. Each module refers to one square on the data grid. The set of QR code data extracted by the QR code reader may be sent to the payment application 105 for initiating the payment transaction.

Operations of the flow diagram depicting the method 650, and combinations of operation in the flow diagram, may be implemented by, for example, hardware, firmware, a processor, circuitry, and/or a different device associated with the execution of software that includes one or more computer program instructions.

FIG. 7A illustrates an example representation of a UI 710 displayed to the user 102 on the display screen of the user device 104 depicting automatic identification of a Uniform Resource Locator (URL) link embedded with the QR code 614 for a payment transaction, in accordance with an example embodiment of the present disclosure. As seen in FIG. 7A, the URL link 712 is present in a document 714. The document 714 is opened in a reading application 700, for example, the reading application 301 which may include a document reader application. It is noted that the URL link 712 may be received directly in an email, a chat, or a text message in the user device 104 from a merchant (e.g., the merchant 114) for a payment transaction. When the user clicks on the URL link 712, a pop-up 716 appears with a list of browsers or browsing applications to open the URL link 712. A browser based on preference of the user 102 is selected. The URL link 712 embedding a QR code is opened in a browsing application, for example, browsing application 341 as shown in FIG. 3B.

FIG. 7B illustrates an example representation of a UI 720 displayed to the user 102 on the display screen of the user device 104 depicting a QR code 722 obtained by invoking the URL link 712, in accordance with an example embodiment of the present disclosure. After invoking a browsing application to access the URL link 712, the user 102 may manually enable the QR capture mode 622 as shown in FIG. 6B for capturing the QR code 722.

FIG. 7C illustrates an example representation of the UI 720 displayed to the user 102 on the display screen of the user device 104 depicting reading of the QR code 722, in accordance with an example embodiment of the present disclosure. As explained with reference to FIG. 6B, a QR capture mode (e.g., the QR capture mode 622 in FIG. 6B) is enabled manually by selecting the QR capture mode 622 from the collapsible action bar 624 in the user device 104. When the QR capture mode 622 is enabled, a capture overlay frame 724 appears on the display screen and captures the QR code 722. The captured QR code 722 is read by using a QR code reader as explained in FIG. 6C. After reading the QR code 722, a checkmark 726 appears for indicating successful reading of the QR code 722.

In yet another example embodiment, the QR code 722 may be captured automatically using a floating button, which is explained with reference to FIGS. 8A-8C to 9A-9C.

Figure 8A:
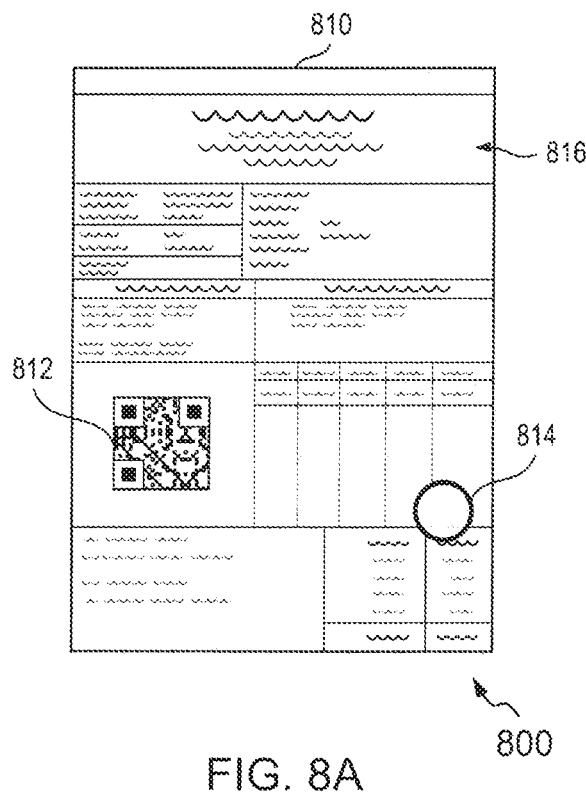
FIG. 8A illustrates an example representation of a UI displayed to the user on the display screen of the user device depicting a floating button on a document including a QR code, in accordance with an example embodiment of the present disclosure.
Figure 8B:
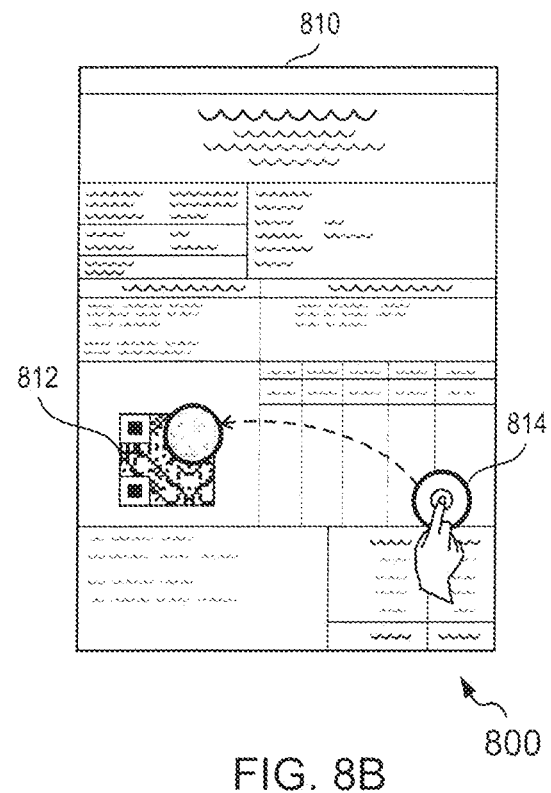
FIG. 8B illustrates an example representation of the UI displayed to the user on the display screen of the user device depicting localizing of the QR code by dragging the floating button over the QR code, in accordance with an example embodiment of the present disclosure.
Figure 8C:
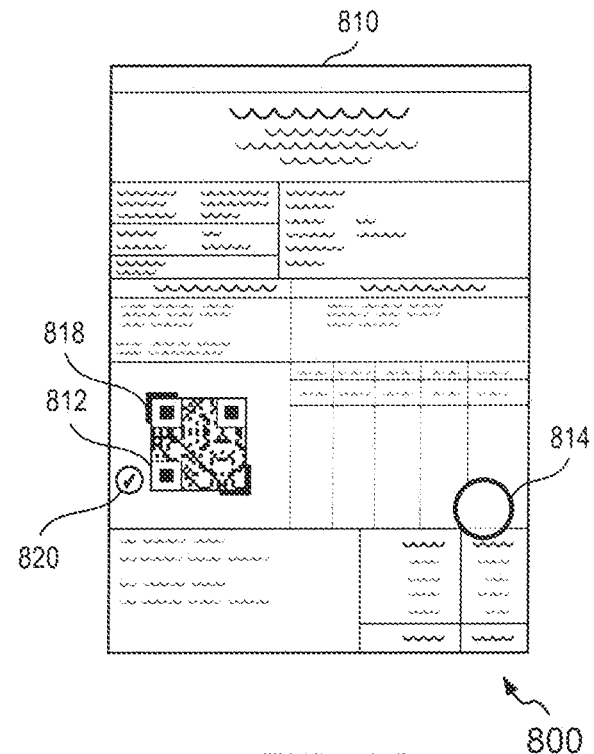
FIG. 8C illustrates an example representation of the UI displayed to the user on the display screen of the user device depicting reading of the of the QR code captured using the floating button, in accordance with an example embodiment of the present disclosure.

Referring now to FIGS. 8A to 8C, an example representation of a UI 810 depicting localizing of a QR code 812 present in a document 816 using a floating button 814 for reading the QR code 812, is illustrated in accordance with an example embodiment of the present disclosure. In one example embodiment, when a paste QR tab 540 (shown in FIG. 5C) is invoked, a floating button 814 appears on the display screen. As seen in FIG. 8A, the floating button 814 appears afloat on top of the document 816 opened in a reading application 800 (e.g., the reading application 301). The user may drag the floating button 814 on top of the QR code 812 as shown in FIG. 8B. The floating button 814 detects the QR code 812 and a capture overlay frame 818 appears on top of the QR code 812 (shown in FIG. 8C) for capturing the QR code 812. The QR code 812 is sent to a QR code reader and the QR code 812 is read by the QR code reader. After successfully reading the QR code 812, a checkmark 820 is displayed to the user 102.

Likewise, the floating button 814 may automatically detect a QR code embedded in a URL link and invoke the URL link consisting of the QR code, which is explained with reference to FIGS. 9A to 9C.

Figure 9A:
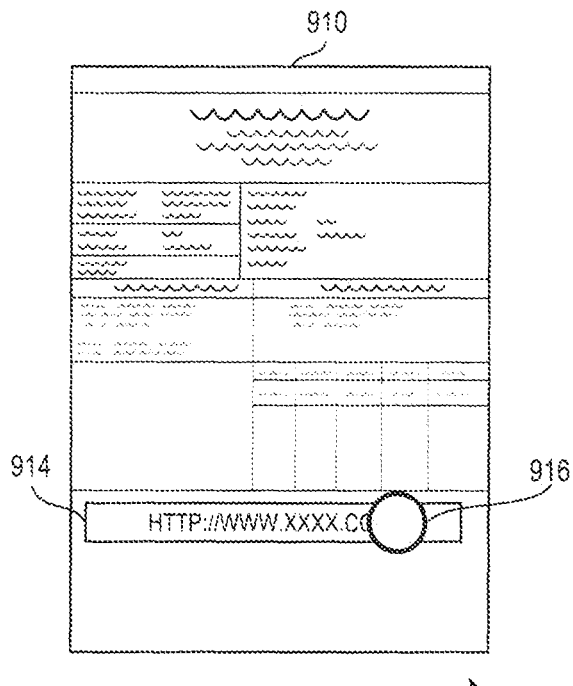
FIG. 9A illustrates an example representation of a UI displayed to the user on the display screen of the user device depicting adaptation of a position of the floating button on the URL including a QR code, in accordance with an example embodiment of the present disclosure.
Figure 9B:
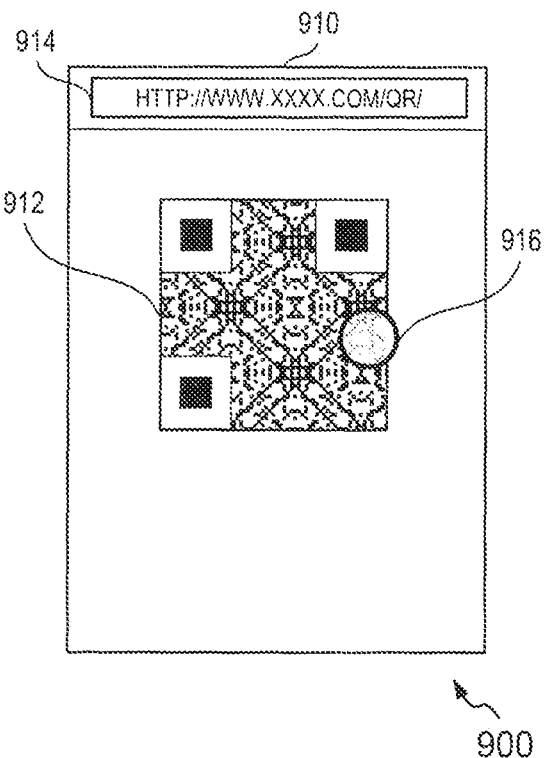
FIG. 9B illustrates an example representation of a UI displayed to the user on the display screen of the user device depicting a QR code displayed upon invoking the URL link by the floating button, in accordance with an example embodiment of the present disclosure.
Figure 9C:
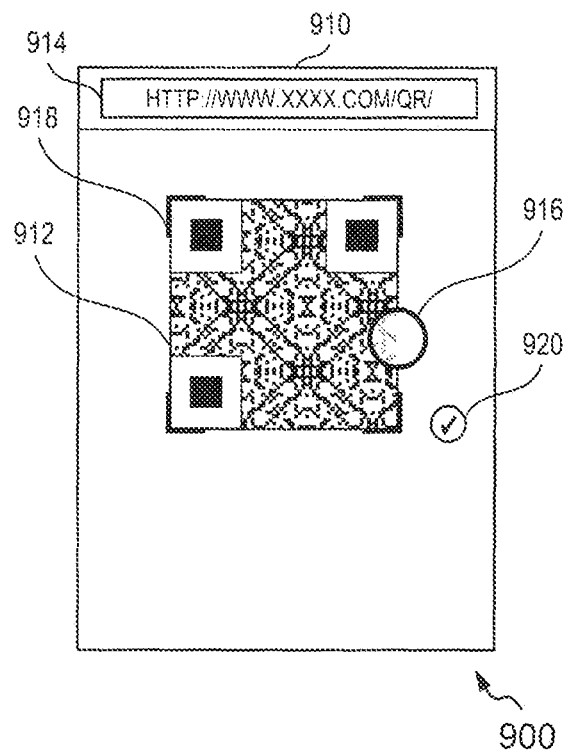
FIG. 9C illustrates an example representation of a UI displayed to the user on the display screen of the user device depicting reading of the QR code using the floating button, in accordance with an example embodiment of the present disclosure.

Referring now to FIGS. 9A to 9C, an example representation of a UI 910 of a reading application 900 depicting reading of a QR code 912 displayed upon invoking a URL link 914, is illustrated in accordance with an example embodiment of the present disclosure. As seen in FIG. 9A, a floating button 916 is dragged on top of the URL link 914. The floating button 916 identifies the URL link 914 and invokes a browser (e.g., the browsing application 341) for opening the URL link 914. When the URL link 914 is opened, the QR code 912 is displayed as shown in FIG. 9B. The floating button 916 identifies the QR code 912. Once the QR code 912 is identified by the floating button 916, a capture overlay frame 918 appears on top of the QR code 912 as shown in FIG. 9C. The capture overlay frame 918 captures the QR code 912 and sends the QR code 912 to a QR code reader for reading the QR code 912. After successfully reading the QR code 912, a checkmark 920 is displayed to the user 102.

Figure 10A:
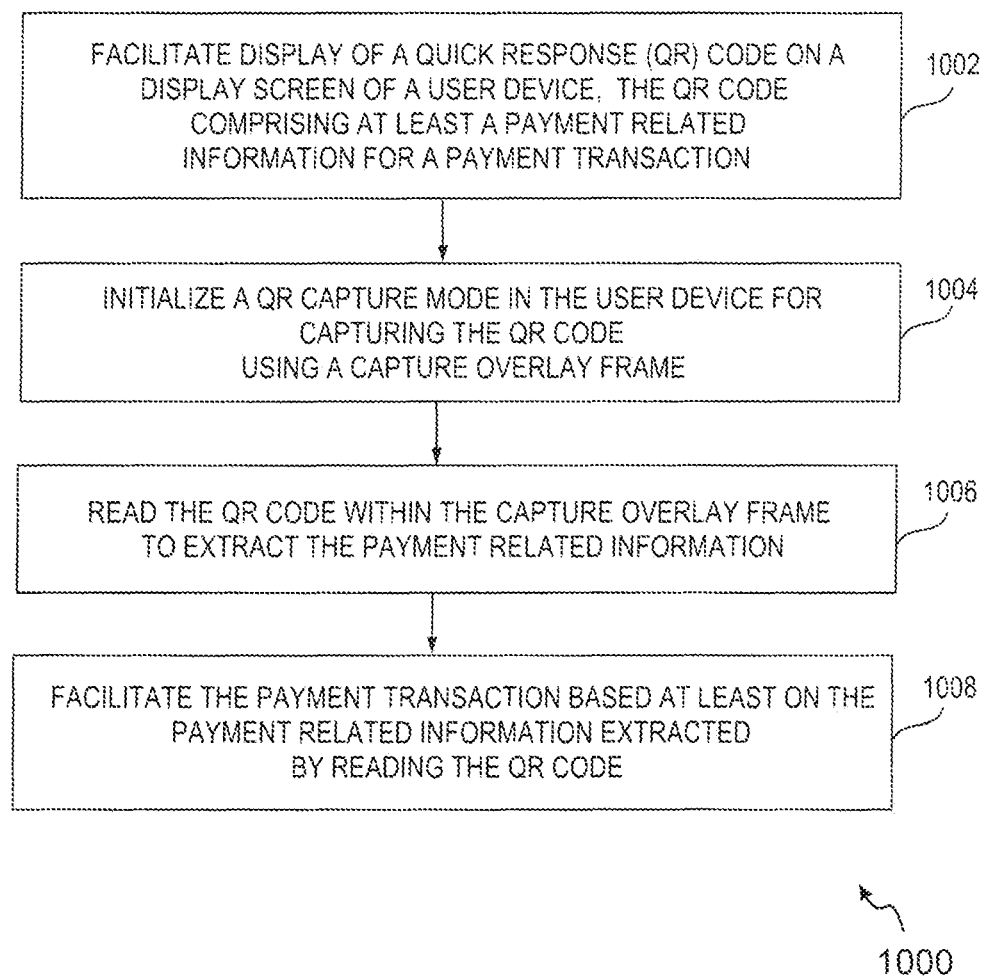
FIG. 10A illustrates a flow diagram depicting a method for reading a QR code displayed on a display screen of a user device for facilitating a payment transaction, in accordance with an example embodiment of the present disclosure.

FIG. 10A illustrates a flow diagram depicting a method 1000 for reading a QR code displayed on a display screen of a user device for facilitating a payment transaction, in accordance with an example embodiment. The method 1000 depicted in the flow diagram may be executed by, for example, a user device in which applications such as QR code reader and/or a payment application equipped with QR code reader feature are present. Operations of the flow diagram 1000, and combinations of operation in the flow diagram 1000, may be implemented by, for example, hardware, firmware, a processor, circuitry, and/or a different device associated with the execution of software that includes one or more computer program instructions. The operations of the method 1000 are described herein may be performed by an application interface in a user device that is hosted and managed with help of the payment server 112 or one or more servers that host the payment applications. The method 1000 starts at operation 1002.

At operation 1002, the method 1000 includes facilitating display of a QR code on a display screen of a user device. In an embodiment, facilitating display of the QR code includes accessing a document in the user device, wherein the document includes the QR code, and initializing a reading application for reading the document for identifying the QR code present in the document. In one embodiment, the QR code is retrieved from a URL link or the document accessible in the user device. The document may include at least one of a text file or an image file from an external source. The document and the URL link may be opened in a reading application and a browsing application, respectively. After opening the document or invoking the URL link, the QR code is displayed in a display screen of the user device.

At operation 1004, the method 1000 includes initializing a QR capture mode in the user device for capturing the QR code using a capture overlay frame. The QR capture mode enables the user to capture and read the QR code displayed in the display screen of the user device. In one example embodiment, the QR capture mode may be enabled manually in the user device. For instance, a collapsible action bar of the user device may be accessed by the user for enabling the QR capture mode. In another example embodiment, the QR capture mode may be enabled automatically. For instance, an application interface (e.g., the payment application 105) may include an option, for example, paste QR option (see, 540 in FIG. 5C) that automatically triggers the QR capture mode in the user device. For example, a floating button stays afloat on the display screen so as to automatically detect a QR code in the document/URL link. In some example embodiments, the user manually drags the floating button on top of the URL link/QR code to detect the QR code. When the QR code is detected, a capture overlay frame is displayed in the user device that helps in capturing the QR code displayed in the user device.

At operation 1006, the method 1000 includes reading the QR code within the capture overlay frame upon capturing the QR code to extract payment related information. In one example, the QR code is localized by dragging the capture overlay frame on top of the QR code. Once the QR code is localized, the QR code within the capture overlay frame is captured. The QR code may be sent to a QR code reader for reading the QR code. The QR code reader processes the QR code and extracts a set of QR data from the QR code. The set of QR data includes payment related information that includes merchant information such as, merchant name, merchant account number, merchant acquirer, a merchant type and a merchant identifier, user details related to services availed and optionally a payment amount for a payment transaction.

At operation 1008, the method 1000 includes initiating a payment transaction using the QR code. In one embodiment, a payment transaction request is initiated in a payment application providing services of using the QR capture mode. The payment transaction request includes the merchant information and payment card information of the user for facilitating the payment transaction. Alternatively, the payment application may broadcast the set of QR data to a plurality of applications installed in the user device. The user may select at least one application from the plurality of applications for processing the payment. For instance, the payment application may enable capturing and reading of the QR code in the display screen of the user device. Assuming the QR code is for a payment transaction with a merchant (e.g., merchant 'X'), the user may select an application "merchant X Pay" (installed in the user device) hosted by the merchant 'X' for payment transactions. In at least one example embodiment, the payment application may invoke at least one application related to the set of QR data for processing the payment transaction. For instance, the payment application on extracting the set of QR data may read the QR data to determine the merchant or any related information for determining if an application hosted by the merchant is installed in the user device. In an example, if the payment application detects the merchant as merchant 'X', the payment application may read attributes of the plurality of application to detect the "merchant X pay" application as hosted by the merchant 'X'. In such cases, the payment application automatically invokes the "merchant X pay" for facilitating the payment transaction. A payment transaction request that includes the QR code is sent to a payment server. The payment server processes the payment transaction.

The sequence of operations of the method 1000 need not be necessarily executed in the same order as they are presented. Further, one or more operations may be grouped together and performed in form of a single step, or one operation may have several sub-steps that may be performed in parallel or in sequential manner.

Figure 10B:
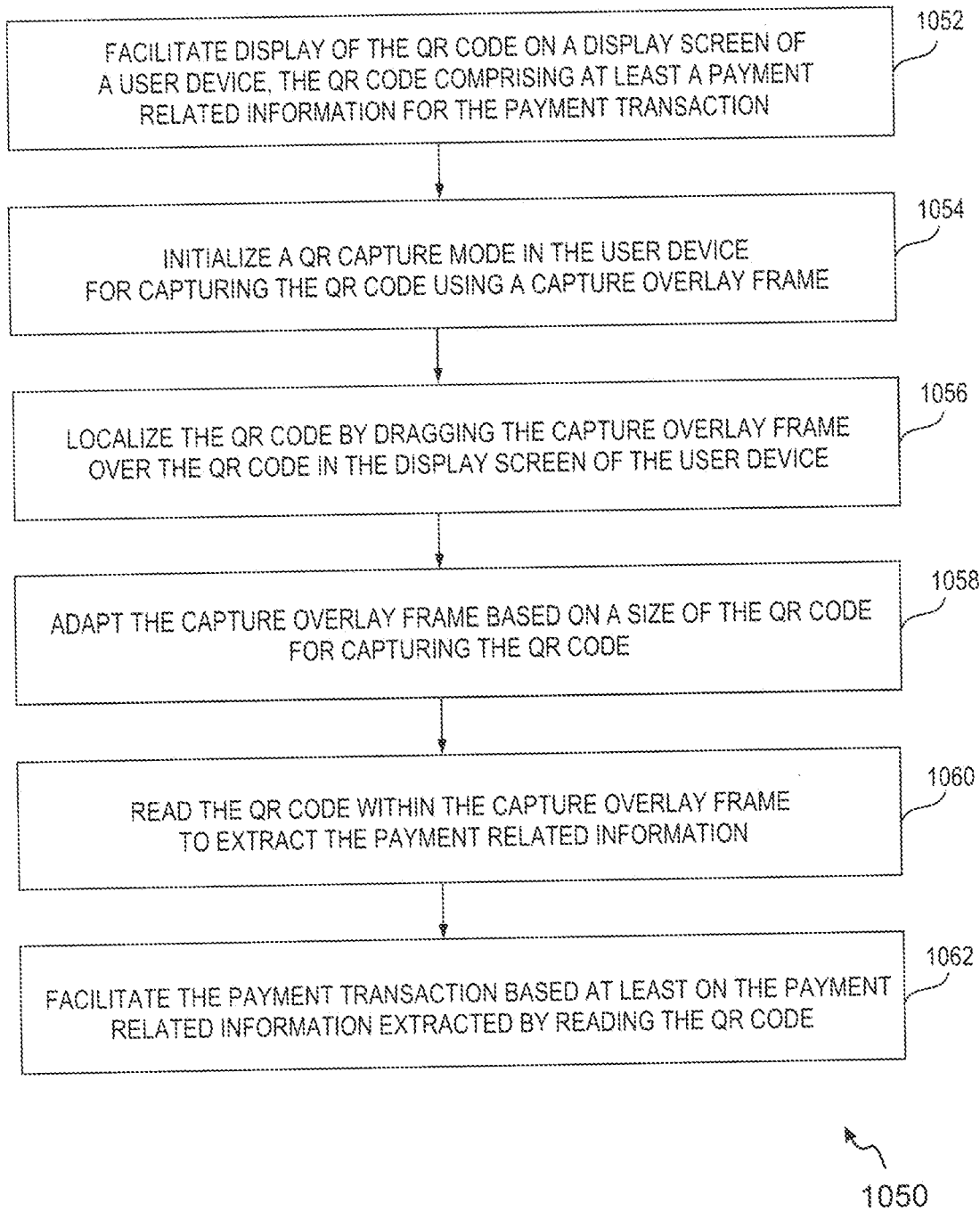
FIG. 10B illustrates a flow diagram depicting a method for reading a QR code displayed on a display screen of a user device for facilitating a payment transaction, in accordance with another example embodiment of the present disclosure.

FIG. 10B illustrates a flow diagram depicting a method 1050 for reading a QR code displayed in a user device for facilitating a payment transaction, in accordance with another example embodiment. Operations of the flow diagram 1050, and combinations of operation in the flow diagram 1050, may be implemented by, for example, hardware, firmware, a processor, circuitry, and/or a different device associated with the execution of software that includes one or more computer program instructions. The operations of the method 1050 are described herein may be performed by an application interface, for example, the payment application 105 in the user device that is hosted and managed with help of the payment server 112. The method 1050 starts at operation 1052.

At operation 1052, the method 1050 includes facilitating display of the QR code on a display screen of a user device. The QR code includes at least a payment related information for the payment transaction. The QR code may be accessed from a document present in the user device. The document may be an invoice received from a merchant for availing services from the merchant. The document may be received from an external source via a chat application, email or accessed on web applications such as, an e-commerce website. In at least one example embodiment, the QR code may be embedded in a URL. The URL may be present in the document or displayed as a payment option on mobile/web applications. The URL is accessed for displaying the QR code.

At operation 1054, the method 1050 includes initializing a QR capture mode in the user device for capturing the QR code using a capture overlay frame. In one embodiment, a payment application, for example, the payment application 105 provides an option for enabling the QR capture mode manually from a collapsible action bar present in the user device. In an example, enabling of the QR capture mode displays the capture overlay frame on the display screen of the user device. In some example embodiments, the payment application may include a paste QR code option (see, 540 in FIG. 5C) and providing a selection input on the paste QR code option in the payment application displays a floating button (see, 814 in FIGS. 8A-8C). The floating button is an example of the QR capture mode and is configured to capture the QR code in the document. In one embodiment, the floating button is manually dragged over the QR code for detecting the QR code. Alternatively, the floating button automatically detects the QR code in the document or the QR code embedded in the URL link. When the QR code is detected in the URL link, the floating button automatically invokes the URL link for accessing the QR code. The floating button on detecting the QR code may display the capture overlay frame for capturing the QR code.

At operation 1056, the method 1050 includes localizing the QR code by dragging the capture overlay frame over the QR code in the display screen of the user device. The capture overlay frame automatically detects the QR code in the display screen and positions itself over the capture overlay frame. Alternatively or additionally, the user may manually drag the capture overlay frame and position the capture overlay frame over the QR code.

At operation 1058, the method 1050 includes adapting the capture overlay frame based on a size of the QR code for capturing the QR code. The capture overlay frame adapts automatically to adapt to a size of the QR code prior to capture. Alternatively or additionally, the user may adapt dimensions of the capture overlay frame manually so as to capture the QR code. It shall be noted that the capture overlay frame is facilitated for capturing the QR code and may not be visible on the display screen or appear as a frame that is proportional to the size of the QR code.

At operation 1060, the method 1050 includes reading the QR code within the capture overlay frame to extract the payment related information. In one embodiment, the QR code is read by a QR code reader present in the user device. Alternatively, the payment application may be equipped with software application to read a set of QR data from the QR code. The set of QR data are the payment related information including merchant information such as, a merchant name, a merchant identifier, a merchant account number, a merchant acquirer, service related information availed by the user such as, service type, a user identifier, a payment cycle for the service, a payment due date, and optionally a payment amount for the service availed by the user.

At operation 1062, the method 1050 includes facilitating the payment transaction based at least on the payment related information extracted by reading the QR code. In an embodiment, the payment application may initiate a payment transaction request. Alternatively, the payment application provides an option for the user to select an application from a plurality of applications present in the user device for further processing of the payment transaction. For example, if the QR code is received for a payment due to Telco 'X' for availing telecommunication services for a past month and if the user has installed an application related to Telco 'X' (e.g., "Telco X Pay"), the payment application may display the plurality of applications in the user device and the user may select the "Telco X Pay" for further processing the payment transaction. Alternatively, the payment application may determine if the user device has an application related to the merchant information from the set of QR data. For example, assuming, the merchant name as Telco 'X', the payment application determines that the "Telco X Pay" is related to the merchant name and automatically invokes the "Telco X Pay" for further processing of the payment transaction. In such cases, the payment transaction request may be initiated from the "Telco X Pay". The payment transaction request may be sent to an acquirer server. The acquirer server forwards the payment transaction request to the payment server. The payment server authenticates identity of the user via the issuer server and then facilitates the payment transaction between a merchant account of the merchant and the issuer account of the user.

The sequence of operations of the method 1050 need not be necessarily executed in the same order as they are presented. Further, one or more operations may be grouped together and performed in form of a single step, or one operation may have several sub-steps that may be performed in parallel or in sequential manner.

Figure 11:
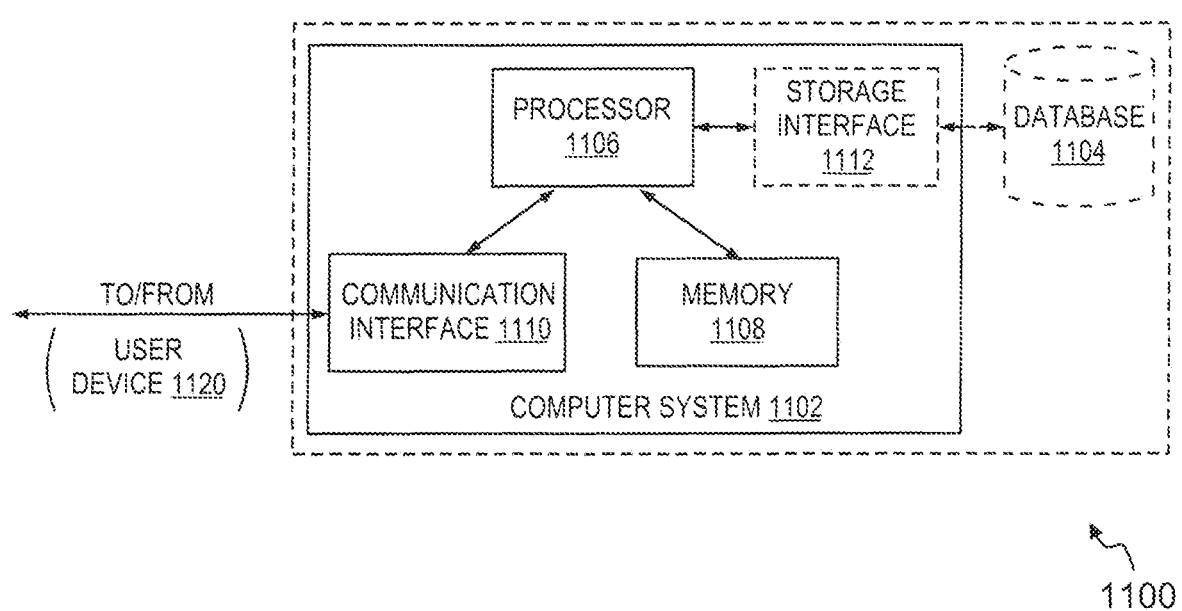
FIG. 11 is a simplified block diagram of a server system for facilitating access to a QR code displayed in a user device for a payment transaction, in accordance with an embodiment of the present disclosure.

FIG. 11 is a simplified block diagram of a server system 1100 for facilitating access to a QR code displayed in a user device, in accordance with an embodiment of the present disclosure. The server system 1100 is an example of a server system (e.g., the payment server 112) that is a part of the payment network 110. The server system 1100 includes a computer system 1102 and a database 1104.

The computer system 1102 includes at least one processor 1106 configured to execute executable instructions for providing various features of the present disclosure. The executing instructions are stored in a memory 1108. The components of the computer system 1102 provided herein may not be exhaustive and that the computer system 1102 may include more or fewer components than that of depicted in FIG. 11. Further, two or more components may be embodied in one single component, and/or one component may be configured using multiple sub-components to achieve the desired functionalities. Some components of the computer system 1102 may be configured using hardware elements, software elements, firmware elements, and/or a combination thereof.

The processor 1106 is operatively coupled to a communication interface 1110 such that computer system 1102 is capable of communicating with a remote device such as a user device 1120 (e.g., the user device 104) or communicates with any entity within the payment network 110. In an embodiment, the communication interface 1110 is configured to receive a request from the user device 1120 for a payment application (e.g., the payment application 105). Further, the communication interface 1110 facilitates provision of the payment application to the user device 1120 upon receipt of the request. Moreover, the communication interface 1110 may receive a payment transaction request from the user device 1120. The communication may be achieved through API calls, without loss of generality.

The processor 1106 may also be operatively coupled to the database 1104. The database 1104 is any computer-operated hardware suitable for storing and/or retrieving data, such as, but not limited to, transaction data generated as part of sales activities conducted over the bankcard network including data relating to merchants, payees, or users, and purchases. The database 1104 may also store information related to a plurality of user's bank accounts. Each user account data includes at least one of a cardholder name, a cardholder address, an account number, MPIN, and other account identifier. The database 1104 may also store information of a plurality of QR codes for initiating payment transactions. The database 1104 may also include instructions for settling transactions including merchant bank account information. The database 1104 is configured to store an instance of the payment application. The database 1104 may include multiple storage units such as hard disks and/or solid-state disks in a redundant array of inexpensive disks (RAID) configuration. The database 1104 may include a storage area network (SAN) and/or a network attached storage (NAS) system.

In some embodiments, the database 1104 is integrated within the user device 1102. For example, the user device 1102 may include one or more hard disk drives as the database 1104. In other embodiments, the database 1104 is external to the user device 1102 and may be accessed by the user device 1102 using a storage interface 1112. The storage interface 1112 is any component capable of providing the processor 1106 with access to the database 1104. The storage interface 1112 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 1106 with access to the database 1104.

The processor 1106 is configured to facilitate a payment transaction from an issuer account of a user (e.g., the user 102) to an acquirer account (a merchant or a payee account). The processor 1106 is configured to perform one or more of the functions such as: facilitate provision of a QR capture mode in the user device for capturing a QR code in a document present in the user device, read the QR code within a capture overlay frame to extract payment related information, and facilitate the payment transaction in the payment application based at least on the payment related information extracted by reading the QR code.

Figure 12:
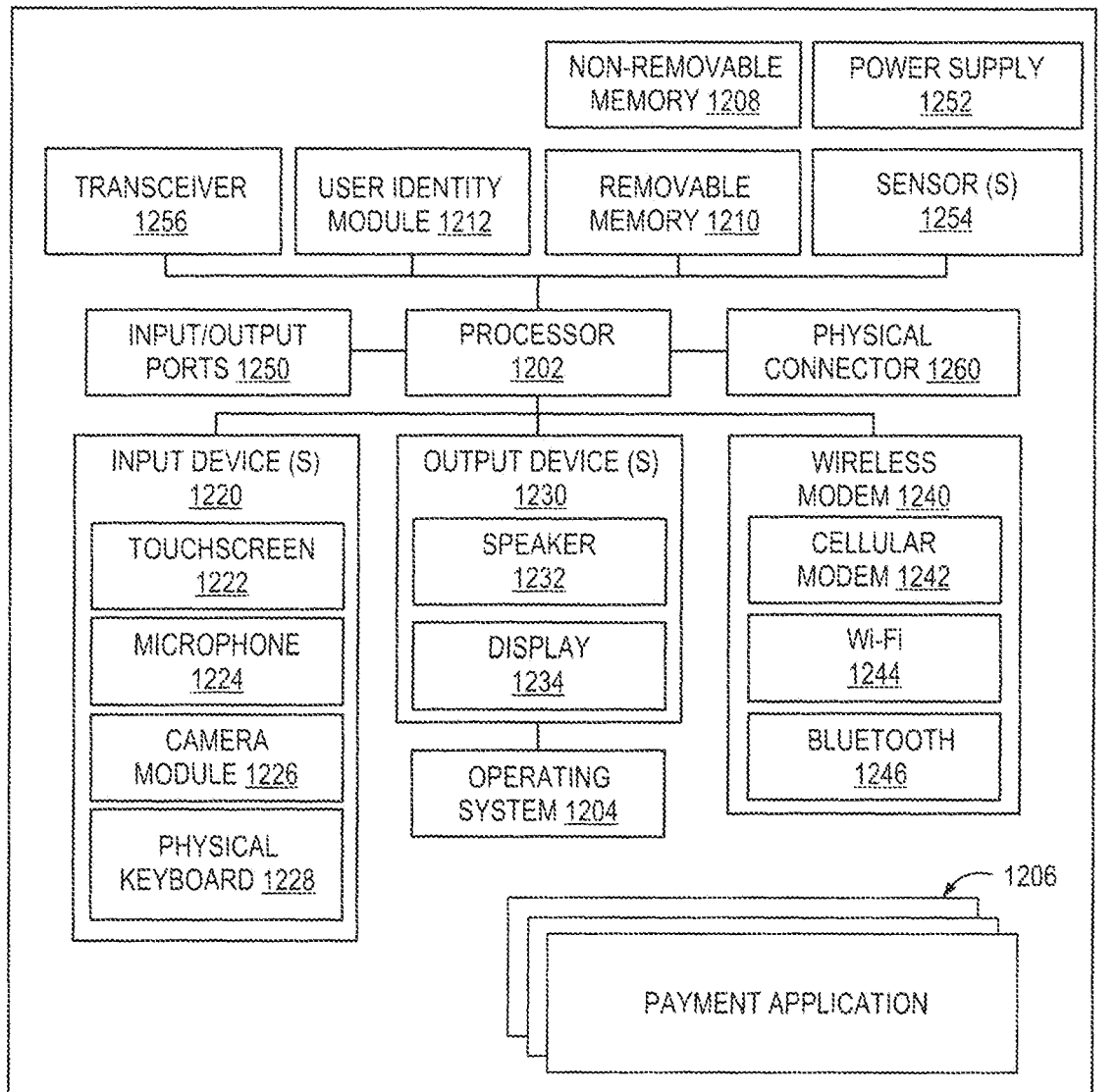
FIG. 12 shows a simplified block diagram of a user device for example, a mobile phone capable of implementing the various embodiments of the present disclosure.

FIG. 12 is a simplified block diagram of a user device 1200 for example, a mobile phone capable of implementing the various embodiments of the present disclosure. The user device 1200 is depicted to include one or more applications 1206. The user device 1200 is an example of the user device 104. It should be understood that the user device 1200 as illustrated and hereinafter described is merely illustrative of one type of device and should not be taken to limit the scope of the embodiments. As such, it should be appreciated that at least some of the components described below in connection with that the user device 1200 may be optional and thus in an example embodiment may include more, less or different components than those described in connection with the example embodiment of the FIG. 12. As such, among other examples, the user device 1200 could be any of an electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated user device 1200 includes a controller or a processor 1202 (e.g., a signal processor, microprocessor, ASIC, or other control and processing logic circuitry) for performing such tasks as signal coding, data processing, image processing, input/output processing, power control, and/or other functions. An operating system 1204 controls the allocation and usage of the components of the user device 1200 and support for one or more applications programs (see, applications 1206), such as a payment application 105 for facilitating reading of a QR code displayed in the user device 1200 of a user (e.g., the user 102). In addition to the application interface, the applications 1206 may include common mobile computing applications (e.g., telephony applications, email applications, calendars, contact managers, web browsers, messaging applications such as USSD messaging or SMS messaging or SIM Tool Kit (STK) application) or any other computing application.

The illustrated user device 1200 includes one or more memory components, for example, a non-removable memory 1208 and/or removable memory 1210. The non-removable memory 1208 and/or removable memory 1210 may be collectively known as database in an embodiment. The non-removable memory 1208 can include RAM, ROM, flash memory, a hard disk, or other well-known memory storage technologies. The removable memory 1210 can include flash memory, smart cards, or a Subscriber Identity Module (SIM). The one or more memory components can be used for storing data and/or code for running the operating system 1204 and the applications 1206. The user device 1200 may further include a user identity module (UIM) 1212. The UIM 1212 may be a memory device having a processor built in. The UIM 1212 may include, for example, a subscriber identity module (SIM), a universal integrated circuit card (UICC), a universal subscriber identity module (USIM), a removable user identity module (R-UIM), or any other smart card. The UIM 1212 typically stores information elements related to a mobile subscriber. The UIM 1212 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The user device 1200 can support one or more input devices 1220 and one or more output devices 1230. Examples of the input devices 1220 may include, but are not limited to, a touch screen/a screen 1222 (e.g., capable of capturing finger tap inputs, finger gesture inputs, multi-finger tap inputs, multi-finger gesture inputs, or keystroke inputs from a virtual keyboard or keypad), a microphone 1224 (e.g., capable of capturing voice input), a camera module 1226 (e.g., capable of capturing still picture images and/or video images) and a physical keyboard 1228. Examples of the output devices 1230 may include, but are not limited to a speaker 1232 and a display 1234. Other possible output devices can include piezoelectric or other haptic output devices. Some devices can serve more than one input/output function. For example, the touch screen 1222 and the display 1234 can be combined into a single input/output device.

A wireless modem 1240 can be coupled to one or more antennas (not shown in the FIG. 12) and can support two-way communications between the processor 1202 and external devices, as is well understood in the art. The wireless modem 1240 is shown generically and can include, for example, a cellular modem 1242 for communicating at long range with the mobile communication network, a Wi-Fi compatible modem 1244 for communicating at short range with an external Bluetooth-equipped device or a local wireless data network or router, and/or a Bluetooth-compatible modem 1246. The wireless modem 1240 is typically configured for communication with one or more cellular networks, such as a GSM network for data and voice communications within a single cellular network, between cellular networks, or between the mobile phone 1200 and a public switched telephone network (PSTN).

The user device 1200 can further include one or more input/output ports 1250 for establishing connection with peripheral devices including a power supply 1252, one or more sensors 1254 for example, an accelerometer, a gyroscope, a compass, or an infrared proximity sensor for detecting the orientation or motion of the user device 1200 and biometric sensors for scanning biometric identity of an authorized user, a transceiver 1256 (for wirelessly transmitting analog or digital signals) and/or a physical connector 1260, which can be a USB port, IEEE 1294 (FireWire) port, and/or RS-232 port. The illustrated components are not required or all-inclusive, as any of the components shown can be deleted and other components can be added.

With the application (see, applications 1206) and/or other software or hardware components, the user device 1200 can implement the technologies described herein. For example, the processor 1202 can cause generation of one or more UIs for accessing a QR code displayed on the user device 1200, reading the QR code and initiating a payment transaction using the QR code.

Without in any way limiting the scope, interpretation, or application of the claims appearing below, a technical effect of one or more of the example embodiments disclosed herein is to provide computer implemented methods and server systems for facilitating a payment transaction with a QR code. A QR capture mode facilitated on a display screen of the user device provisions an option for the user to scan/read payment related information in the QR code and process the payment transaction in the same user device. Further, the limitation of using another electronic device to capture the QR code and reading the QR data for determining the payment related information may be precluded. Moreover, ease of access in capturing the QR code that is either present in a document or a URL using the QR capture mode ensures a hassle free experience for the user while making payments for invoices electronically via the user device.

The disclosed methods with reference to FIGS. 1 to 12, or one or more operations of the flow diagram 1000 and the flow diagram 1050 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the disclosure has been described with reference to specific exemplary embodiments, it is noted that various modifications and changes may be made to these embodiments without departing from the broad spirit and scope of the disclosure. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server system 1100 (e.g. payment server 112) and its various components such as the computer system 1102 and the database 1104 may be enabled using software and/or using transistors, logic gates, and electrical circuits (for example, integrated circuit circuitry such as ASIC circuitry). Various embodiments of the disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the disclosure, as discussed above, may be practiced with steps and/or operations in a different order, and/or with hardware elements in configurations, which are different than those which, are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer implemented method comprising:
    receiving, by a processor of a user device, from an external source associated with a recipient, a file including a Quick Response (QR) code, the QR code comprising payment related information for a payment transaction and recipient information;
    storing, by the processor, the file in a memory of the user device;
    facilitating, by the processor, display of the QR code on a display screen of the user device, the QR code being accessed from the file stored in the memory of the user device;
    initializing, by the processor, a QR capture mode in the user device for capturing the QR code using a capture overlay frame;
    localizing, by the processor, the QR code by positioning the capture overlay frame on top of the QR code in the display screen of the user device;
    adapting, by the processor, the capture overlay frame based on a size of the QR code for capturing the QR code;
    reading, by the processor, the QR code within the capture overlay frame to extract the payment related information and the recipient information; and
    transmitting, by the processor, a payment request for the payment transaction to a payment server, wherein the payment request includes at least the payment related information and the recipient information extracted by reading the QR code, and wherein the recipient information enables the payment server to settle the payment transaction via an acquirer account of the recipient.

2. The method according to claim 1, wherein facilitating display of the QR code comprises:
    initializing, by the processor, a reading application for reading the document for identifying the QR code present in the document.

3. The method according to claim 2, wherein the external source is at least one of:
    a website;
    a chat application;
    a billing application; and
    an e-commerce application.

4. The method according to claim 1, wherein facilitating display of the QR code comprises:
    identifying, by the processor, a Uniform Resource Locator (URL), wherein the URL is embedded with the QR code; and
    invoking, by the processor, a browsing application to access the URL for displaying the QR code.

5. The method according to claim 1, wherein the payment related information is at least one of:
    merchant information;
    a payment amount;
    a payment due date;
    a user identifier; and
    a payment cycle for the payment transaction.

6. The method according to claim 5, wherein the recipient information comprises at least one of:
    a merchant name;
    a merchant identifier;
    a merchant account number;
    a merchant type; and
    an acquirer associated with a merchant account number.

7. The method according to claim 1, wherein facilitating the payment transaction comprises:
    determining, by the processor, at least one application among a plurality of applications in the user device based on the payment related information; and
    invoking, by the processor, the at least one application in the user device for processing the payment transaction.

8. The method according to claim 1, further comprising:
    upon successfully reading the QR code, by the processor, facilitating display of a notification for a user on the display screen of the user device.

9. A server system comprising:
    a database configured to store an instance of a payment application; and
    a processing module in operative communication with the database, the processing module configured to provision the payment application to a user device upon request, the payment application comprising instructions configured to:
  receive, by a processor of the user device, from an external source associated with a merchant, a file including a machine readable code, the machine readable code comprising payment related information for a payment transaction and merchant information;
  store the file in a memory of the user device;
  initialize, by the processor, a machine readable code capture mode in the user device for capturing the machine readable code present in a display screen of the user device using a capture overlay frame, the machine readable code being accessed from the file stored in the memory of the user device;
  localize, by the processor, the machine readable code by positioning the capture overlay frame on top of the machine readable code in the display screen of the user device;
  adapt, by the processor, the capture overlay frame based on a size of the machine readable code for capturing the machine readable code;
  read the machine readable code within the capture overlay frame to extract the payment related information and the merchant information; and
  transmit a payment request for the payment transaction to a payment server, wherein the payment request includes at least the payment related information and the merchant information extracted by reading the machine readable code, and wherein the merchant information enables the payment server to settle the payment transaction via an acquirer account of the merchant.

10. The server system according to claim 9, the external source being at least one of:
  a website;
  a chat application;
  a billing application; and
  an e-commerce application.

11. The server system according to claim 9, wherein the payment application further comprises instructions configured to:
  identify a Uniform Resource Locator (URL) in the document, wherein the URL is embedded with the machine readable code; and
  invoke a browsing application to access the URL for displaying the machine readable code.

12. The server system according to claim 9, wherein the payment application further comprises instructions configured to facilitate a floating button on a display screen, the floating button configured to be dragged on the display screen to overlap with the machine readable code displayed on the display screen for capturing the machine readable code.

13. The server system according to claim 9, wherein the payment related information is at least one of:
  merchant information;
  a payment amount;
  a payment due date;
  a user identifier; and
  a payment cycle for the payment transaction.

14. A method for a payment transaction using a Quick Response (QR) code, the method comprising:
  receiving, by a processor of a user device, from an external source associated with a merchant, a file including a Quick Response (QR) code, the QR code comprising payment related information for a payment transaction and merchant information;
  storing, by the processor, the file in a memory of the user device;
  facilitating, by the processor, display of the QR code on a display screen of the user device, the QR code being accessed from the file stored in the memory of the user device;
  initializing, by the processor, a QR capture mode in the user device for capturing the QR code using a capture overlay frame;
  localizing, by the processor, the QR code by positioning the capture overlay frame on top of the QR code in the display screen of the user device;
  adapting, by the processor, the capture overlay frame based on a size of the QR code for capturing the QR code;
  reading, by the processor, the QR code within the capture overlay frame to extract the payment related information; and
  transmitting, by the processor, a payment request for the payment transaction to a payment server, wherein the payment request includes at least the payment related information and the merchant information extracted by reading the QR code, and wherein the merchant information enables the payment server to settle the payment transaction via an acquirer account of the merchant.

15. The method according to claim 14, wherein facilitating display of the QR code comprises:
  initializing, by the processor, a reading application for reading the document for identifying the QR code present in the document.

16. The method according to claim 14, wherein facilitating display of the QR code comprises:
  accessing, by the processor, a Uniform Resource Locator (URL) link in a document, the URL link being embedded with the QR code; and
  invoking, by the processor, a browsing application to access the URL for displaying the QR code.

* * * * *